US012654066B2

(12) United States Patent
Meckenzie et al.

(10) Patent No.: US 12,654,066 B2
(45) Date of Patent: Jun. 16, 2026

(54) SYSTEMS AND METHODS FOR GAMIFICATION OF EXERCISE ROUTINES

(71) Applicant: AMP FIT ISRAEL LTD, Tel Aviv (IL)

(72) Inventors: Shalom Meckenzie, Savyon (IL); Amir Levanon, Nir Banim (IL)

(73) Assignee: AMP FIT ISRAEL LTD, Tel Aviv (IL)

( * ) Notice: Subject to any disclaimer, the term of this patent is extended or adjusted under 35 U.S.C. 154(b) by 0 days.

(21) Appl. No.: 19/308,472

(22) Filed: Aug. 25, 2025

(65) Prior Publication Data

US 2025/0375664 A1 Dec. 11, 2025

Related U.S. Application Data

(63) Continuation of application No. PCT/IB2025/052014, filed on Feb. 25, 2025.
(Continued)

(51) Int. Cl.
*A63B 24/00* (2006.01)
*A63B 21/00* (2006.01)
(Continued)

(52) U.S. Cl.
CPC ........ *A63B 24/0062* (2013.01); *A63B 21/151* (2013.01); *A63B 71/0622* (2013.01);
(Continued)

(58) Field of Classification Search
CPC .............. A63B 21/151; A63B 24/0062; A63B 71/0669; A63B 71/0686;
(Continued)

(56) References Cited

U.S. PATENT DOCUMENTS 7,871,355 B2    1/2011   Yeh
9,367,860 B2    6/2016   McKirdy
(Continued)

FOREIGN PATENT DOCUMENTS

CN          116540878 A      8/2023

OTHER PUBLICATIONS

International Search Report and Written Opinion in corresponding PCT/IB2025/052014 application dated Jun. 25, 2025 (15 pages).

*Primary Examiner* — Joshua Lee
(74) *Attorney, Agent, or Firm* — FINNEGAN, HENDERSON, FARABOW, GARRETT & DUNNER L.L.P.

(57) ABSTRACT

Systems, methods, and computer readable medium are provided for gamifying a physical exertion session. Gamifying a physical exertion session may include receiving signals indicative of exercise equipment movement repetitions, the signals corresponding to at least one property of manual exercise movements; presenting via a display, a controllable element being movable along a first axis; presenting a plurality of pacing elements movable along a plurality of second axes transverse to the first axis, wherein movement of the pacing elements corresponds to a desired pace of the exercise equipment movement repetitions; regulating movement of the controllable element along the first axis to correspond to the speeds of the manual exercise movements; determining collisions between the controllable element movable along the first axis and the plurality of pacing elements movable along the plurality of transverse second axes; and upon determination of a collision, causing a collision indication to appear on the display.

20 Claims, 12 Drawing Sheets

Related U.S. Application Data

(60) Provisional application No. 63/557,711, filed on Feb. 26, 2024.

(51) Int. Cl.

| | |
|---|---|
| *A63B 71/06* | (2006.01) |
| *A63F 13/214* | (2014.01) |
| *A63F 13/816* | (2014.01) |

(52) U.S. Cl.
CPC ...... *A63B 71/0669* (2013.01); *A63B 71/0686* (2013.01); *A63F 13/214* (2014.09); *A63F 13/816* (2014.09); *A63B 2024/0068* (2013.01); *A63B 2071/0644* (2013.01); *A63B 2071/065* (2013.01); *A63B 2220/05* (2013.01); *A63B 2220/805* (2013.01); *A63B 2225/50* (2013.01)

(58) Field of Classification Search
CPC ...... A63B 2024/0068; A63B 2071/065; A63B 2220/05; A63B 2225/50; A63F 13/214; A63F 13/816

See application file for complete search history.

(56) References Cited

U.S. PATENT DOCUMENTS

| | | | | |
|---|---|---|---|---|
| 10,213,647 | B2 * | 2/2019 | Balakrishnan | H01Q 1/44 |
| 10,953,307 | B2 * | 3/2021 | Wilson | A61B 5/1112 |
| 11,004,351 | B2 * | 5/2021 | Anderson-Hanley | G09B 7/02 |
| 11,511,156 | B2 * | 11/2022 | Shavit | A61B 5/1123 |
| 11,904,207 | B2 * | 2/2024 | Bissonnette | G16H 20/30 |
| 11,944,892 | B2 * | 4/2024 | Intonato | A63B 24/0062 |
| 12,238,178 | B2 * | 2/2025 | Zhou | H04L 67/535 |
| 12,447,377 | B2 | 10/2025 | Yoo et al. | |
| 2007/0213126 | A1 * | 9/2007 | Deutsch | A63B 71/03 |
| | | | | 473/422 |
| 2010/0197462 | A1 | 8/2010 | Piane, Jr. | |
| 2014/0257534 | A1 * | 9/2014 | Morris | G06F 17/40 |
| | | | | 700/91 |
| 2014/0274564 | A1 | 9/2014 | Greenbaum | |
| 2017/0368413 | A1 | 12/2017 | Shavit | |
| 2021/0350923 | A1 | 11/2021 | McKirdy | |
| 2022/0296966 | A1 | 9/2022 | Asikainen et al. | |

* cited by examiner

300

Lateral Raise

1/1 Set 412
406
408
418
410
422
420
404
402
414
416
306
304
326
50%
12 of 80
324

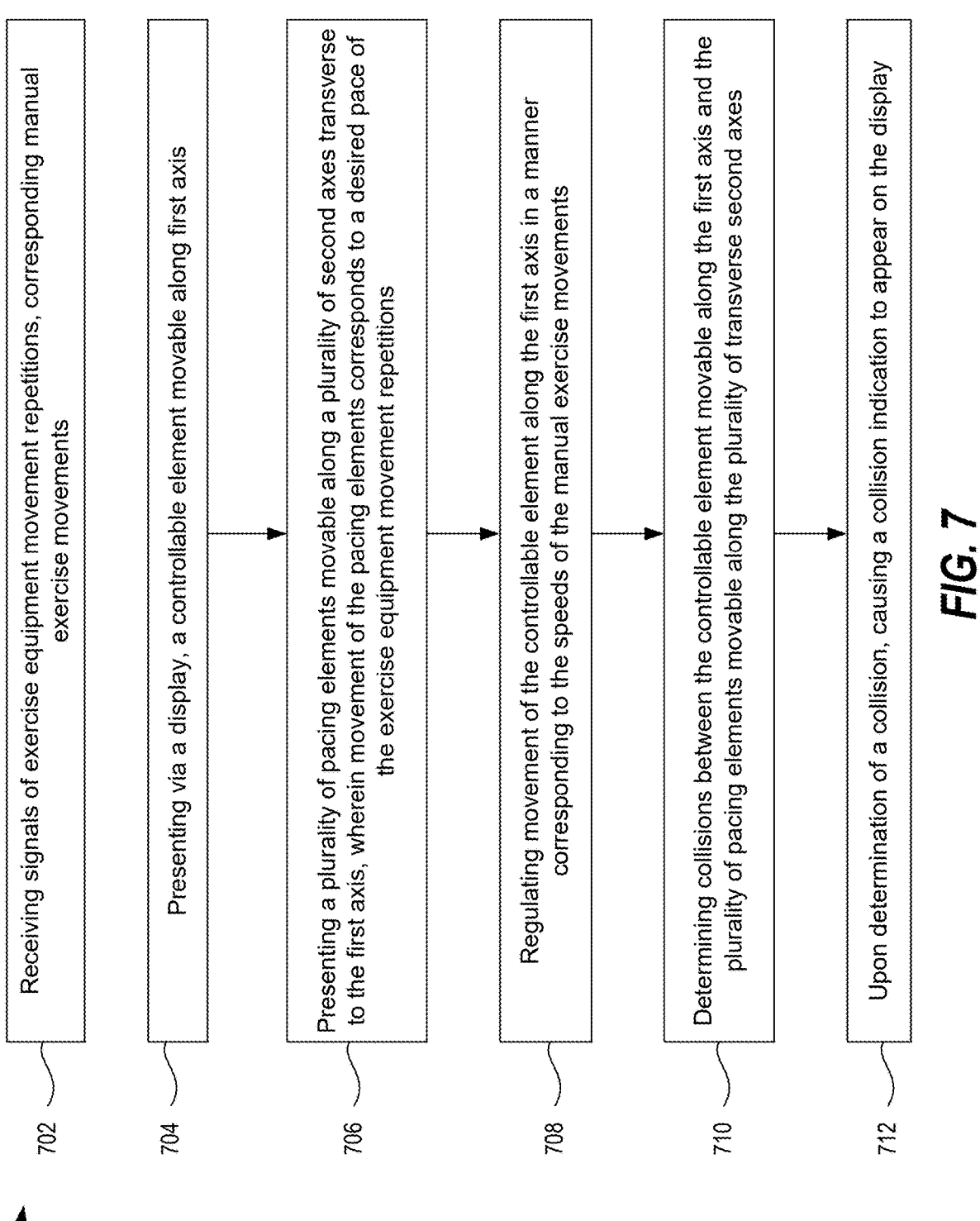

702 — Receiving signals of exercise equipment movement repetitions, corresponding manual exercise movements 704 — Presenting via a display, a controllable element movable along first axis 706 — Presenting a plurality of pacing elements movable along a plurality of second axes transverse to the first axis, wherein movement of the pacing elements corresponds to a desired pace of the exercise equipment movement repetitions 708 — Regulating movement of the controllable element along the first axis in a manner corresponding to the speeds of the manual exercise movements 710 — Determining collisions between the controllable element movable along the first axis and the plurality of pacing elements movable along the plurality of transverse second axes 712 — Upon determination of a collision, causing a collision indication to appear on the display

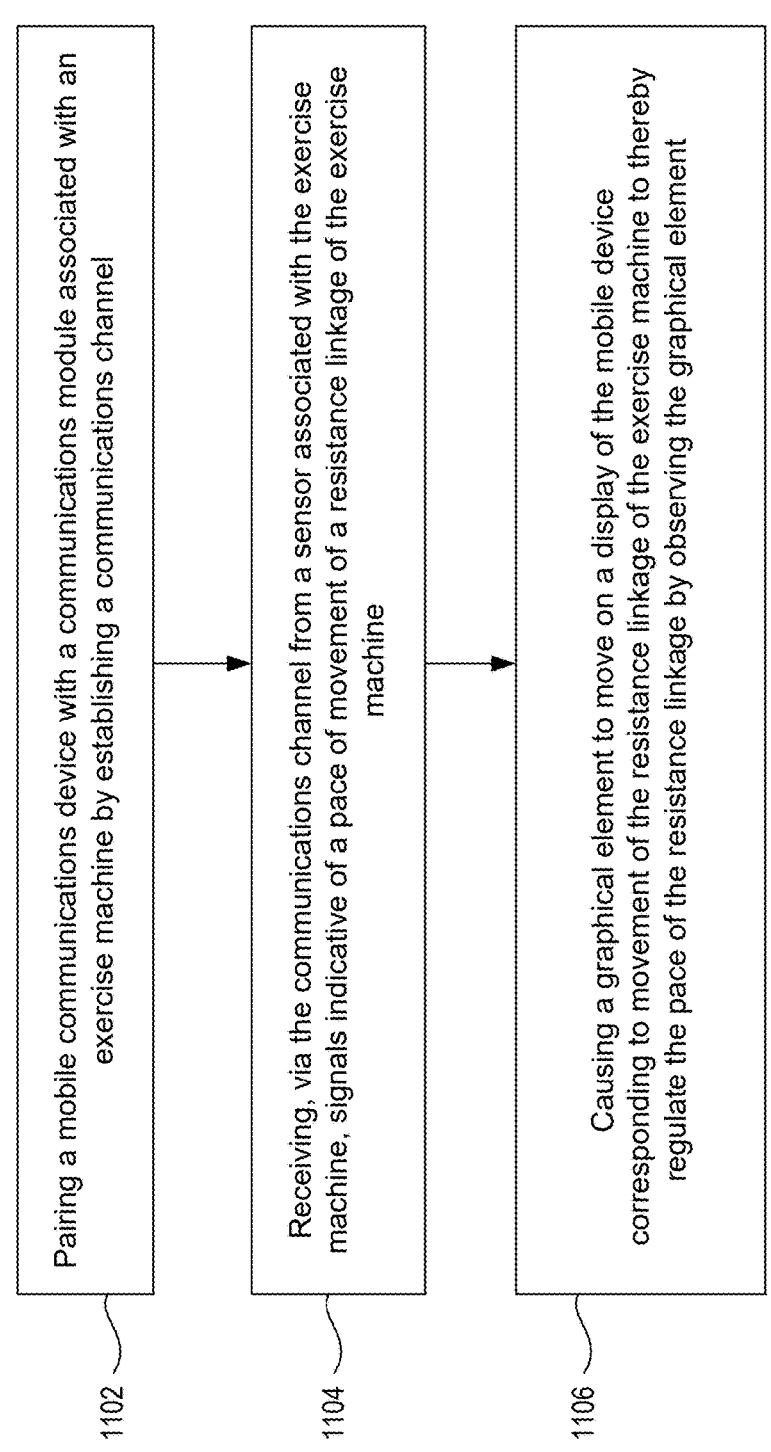

1100

1102 — Pairing a mobile communications device with a communications module associated with an exercise machine by establishing a communications channel 1104 — Receiving, via the communications channel from a sensor associated with the exercise machine, signals indicative of a pace of movement of a resistance linkage of the exercise machine 1106 — Causing a graphical element to move on a display of the mobile device corresponding to movement of the resistance linkage of the exercise machine to thereby regulate the pace of the resistance linkage by observing the graphical element

*FIG. 11*

SYSTEMS AND METHODS FOR GAMIFICATION OF EXERCISE ROUTINES

CROSS REFERENCES TO RELATED APPLICATIONS

This application is a continuation of PCT International Application No. PCT/IB2025/052014, filed Feb. 25, 2025 and claims the benefit of priority of U.S. provisional application no. 60/63/557,711, filed on Feb. 26, 2024 which is incorporated herein by reference.

TECHNICAL FIELD

The present disclosure generally relates to the field of gamification of exercise routines. More specifically, the present disclosure relates to systems, methods, and devices for gamifying one or more exercise routines.

BACKGROUND

Pacing during performance of an exercise routine may be important for achieving an exercise goal and avoiding injury. However, some pacing technologies may cause an exercise routine to feel tedious and mechanical. This may diminish a user's motivation to persevere until their exercise goal is reached. Therefore, there is a need for unconventional innovative technologies to gamify pacing of exercise routines. Such gamification may transform an otherwise tedious exercise routine into a challenge, motivating users to continue pursuing the exercise routine until their goal is reached, and/or to improve on past performance. Various aspects of this disclosure address the forgoing issues and others.

SUMMARY

Embodiments consistent with the present disclosure provide systems and methods generally relating to gamifying a physical exertion session. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer readable storage media may store program instructions, which are executable by at least one processing device and perform any of the steps and/or methods described herein.

Consistent with disclosed embodiments, systems and methods are provided for gamification of a physical exertion session. The embodiments may include hardware and/or software for receiving signals indicative of exercise equipment movement repetitions, the signals corresponding to at least one property of manual exercise movements; presenting via a display, a controllable element, the controllable element being movable along a first axis; presenting via the display, a plurality of pacing elements movable along a plurality of second axes transverse to the first axis, wherein movement of the pacing elements corresponds to a desired pace of the exercise equipment movement repetitions; regulating movement of the controllable element along the first axis in a manner corresponding to the speeds of the manual exercise movements; determining collisions between the controllable element movable along the first axis and the plurality of pacing elements movable along the plurality of transverse second axes; and upon determination of a collision, causing a collision indication to appear on the display.

Consistent with disclosed embodiments, systems and methods are provided for an exercise machine configured for pairing with a mobile communications device in order to permit the communications device to be used as a gamification display for regulating usage of the exercise machine. The exercise machine may include a frame; a resistance linkage; a resistance applicator mounted to the frame and coupled to the resistance linkage, wherein the resistance applicator is configured to apply resistance to a user-engaging element associated with the resistance linkage; at least one sensor for detecting a pace of movement of the resistance linkage; a transmitter configured for pairing with a mobile communications device having a display and running software for causing a graphical element to move on the display; and at least one processor configured to receive pace indications from the sensor and to output for transmission by the transmitter, pacing signals configured, upon receipt by the mobile communications device, to cause the graphical element to move at a pace corresponding to the pace of movement of the resistance linkage thereby enabling regulation of the pace of movement of the resistance linkage via observation of the graphical element on the display of the mobile communications device paired with the transmitter.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

FIG. 7 is a flowchart of example process for gamifying a physical exertion session, consistent with embodiments of the present disclosure.

FIG. 11 is a flowchart of example process for causing a mobile communications device to serve as a gamification display for regulating usage of an exercise machine, consistent with embodiments of the present disclosure.

DETAILED DESCRIPTION

Figure 1:
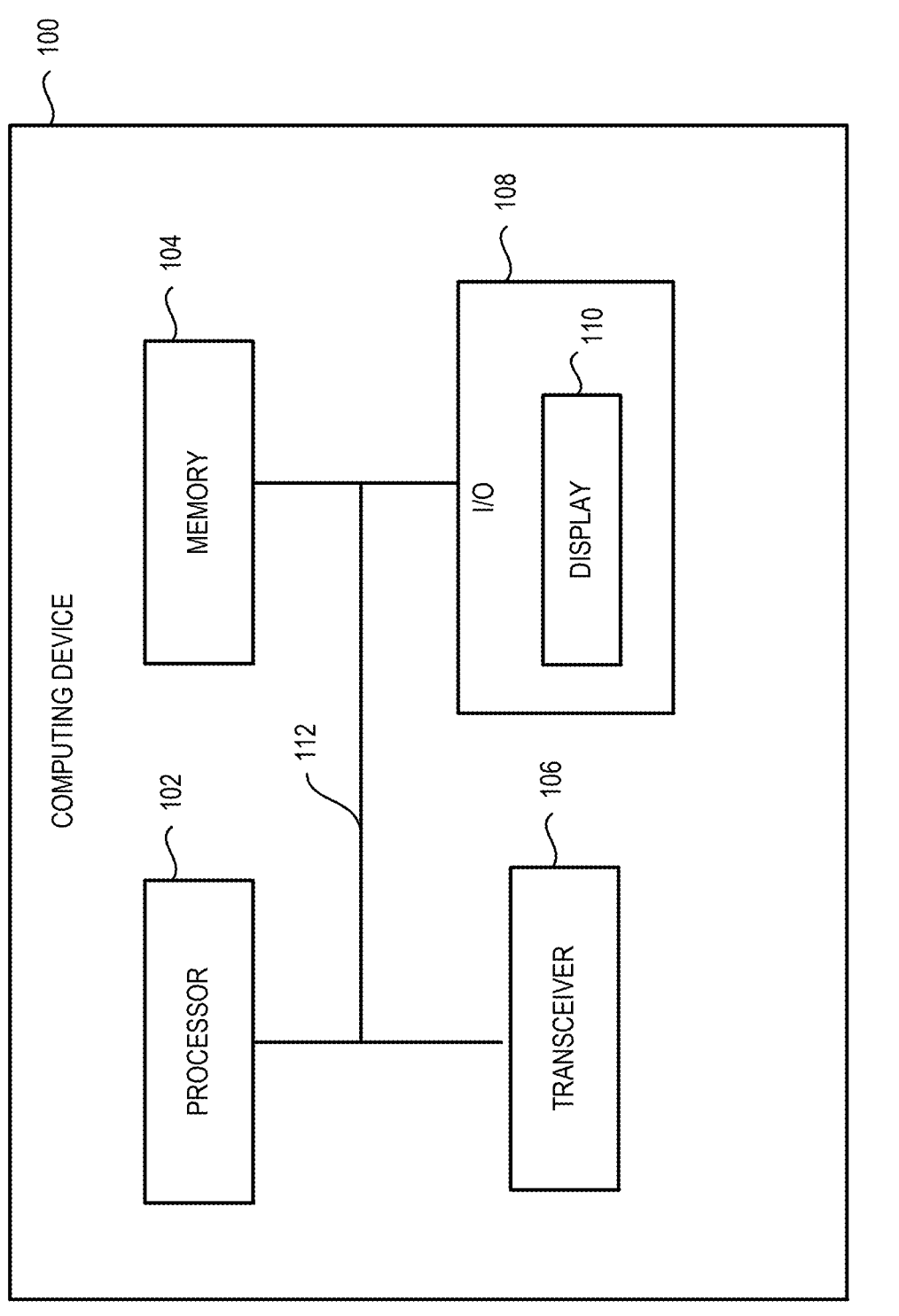
FIG. 1 Illustrates an exemplary schematic diagram of a computing device, consistent with some disclosed embodiments.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily lack that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The terms, generally, substantially, or approximately as used in this disclosure should be interpreted to encompass commonly understood design, machining, and/or manufacturing tolerances. For example, equidistant may refer to the same distance within +/−1%, +/−2%, or within +/−5%. Substantially and/or approximately transverse may refer to transverse within +/−1%, +/−2%, +/−5%, +/−10%, or +/−15%.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims Some embodiments involve a computing device. A computing device as used herein may include any electrical component or group of electrical components capable of processing data by performing calculations, executing instructions, or running software programs. For example, a computing device may include at least one processor. Such a computing device may include a smartphone, a tablet, a smartwatch, a personal digital assistant, a desktop computer, a laptop computer, an IoT device, a dedicated terminal, a smart, and/or any other electronic device that enables computation, instruction execution, or running software programs. In some embodiments, a computing device may include at least one processor, at least one memory, a transceiver, and an input/output unit, all interconnected via one more buses. In some embodiments, a computing device may include a communications device capable of exchanging data using a wired and/or wireless communications network.

At least one processor may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively and may be co-located or located remotely from each other. The processors may be coupled electrically, magnetically, optically, acoustically, mechanically or by other means that permit them to interact. In some embodiments, the at least one processor may include a remote processing unit (e.g., a "cloud computing" resource) accessible via a communications network. The at least one memory may include a Random Access Memory (RAM), a Read-Only Memory (ROM), a hard disk, an optical disk, a magnetic medium, a flash memory, other permanent, fixed, or volatile memory, or any other mechanism capable of storing instructions. Such a memory may be pre-loaded with instructions for execution by at least one processor. In some embodiments, the at least one memory may include a remote storage (e.g., "cloud" storage) accessible via a communications network.

A processor may be configured to perform calculations and computations, such as arithmetic and/or logical operations to execute software instructions, control and run processes, and store, manipulate, and delete data from memory. An example of a processor may include a microprocessor manufactured by Intel™. A processor may include a single core or multiple core processors executing parallel processes simultaneously. It is appreciated that other types of processor arrangements could be implemented to provide the capabilities disclosed herein.

At least one processor may include a single processor, or multiple processors communicatively linked to each other and capable of performing computations in a cooperative manner, such as to collectively perform a single task by dividing the task into subtasks and distributing the subtasks among the multiple processors, e.g., using a load balancer. In some embodiments, at least one processor may include multiple processors communicatively linked over a communications network (e.g., a local and/or remote communications network including wired and/or wireless communications links). The multiple linked processors may be configured to collectively perform computations in a distributed manner (e.g., as known in the art of distributed computing).

A non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located locally (e.g., in physical proximity to at least one processor and connected via a local communications link) or at a remote location (e.g., accessible to at least one processor via a communications network). Additionally, one or more computer-readable storage mediums can be utilized in implementing a computer-implemented method. Accordingly, the term computer-readable storage medium should be understood to include tangible items and exclude carrier waves and transient signals.

A transmitter may include an electronic device for sending signals and/or data over distance. A transmitter may encode information to a format suitable for transmission through a medium. A transmitter may send information as electromagnetic radiation (e.g., radio and/or optical waves and/or pulses), electric signals, magnetic signals, audio signals, mechanical vibrations, ultrasound signals, and/or any other type of signal. Some examples of transmitters may include Bluetooth and/or Wi-Fi antennas, and/or optical transmitters. In some embodiments, a sensor may be configured with a transmitter to transmit signals encoding sensed data to at least one processor. In some embodiments, a computing device (e.g., a mobile communications device) may include at least one transmitter.

A display may include an output device for visually presenting information, allowing users to interact with and/or view data, applications, and/or multimedia content. For example, a display may include a monitor and/or screen that converts digital signals into images, text, and/or videos by activating one or more pixels or voxels. A display may include, for example, a light-emitting diode (LED) display, an organic light-emitting diode (OLED) display, a liquid-crystal display (LCD), a dot-matrix display, a plasma display, a screen, a touch screen, a light indicator, a light source, or any other device configured to provide visual or optical output. A display may include a two dimensional display or a three-dimensional display (e.g., associated with a wearable display).

By way of a non-limiting example, reference is made to FIG. 1 illustrating an exemplary schematic diagram of a computing device 100, consistent with some disclosed embodiments. Computing device 100 may include at least one processor 102, at least one memory 104 (e.g., a non-transitory computer readable medium), a transceiver 106, and an input/output (I/O) unit 108. At least one processor 102, at least one memory 104, transceiver 106, and input/output unit 108 may be interconnected via a bus 112. In some embodiments, input/output unit 108 may include a display 110. Display 110 may include one or more touch sensitive surfaces, permitting computing device 100 to receive inputs from a user, and present outputs to a user.

A signal may refer to information encoded for transmission via a physical medium. Examples of signals may include signals in the electromagnetic radiation spectrum (e.g., AM or FM radio, Wi-Fi, Bluetooth, radar, visible light, lidar, IR, Zigbee, Z-wave, and/or GPS signals), audio and/or ultrasonic signals, electrical signals (e.g., voltage, current, or electrical charge signals), electronic signals (e.g., as digital data), tactile signals (e.g., touch), and/or any other type of information encoded for transmission between two or more entities via a physical medium.

Consistent with the present disclosure, some disclosed embodiments involve a network. A network (e.g., a communications network) may include any type of physical or wireless computer networking arrangement used to exchange data. Such a network may include one or more of a digital communications network, an analog communication network, and/or any other communications network configured to convey data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

A mobile communications device (e.g., a mobile computing device) refers to a portable computing device capable of transmitting and receiving information to and from other devices and/or networks. Mobile communications devices may, for example, use cellular or other wireless and/or wired networks to transmit information such as voice and/or other data. For example, such transmissions may be in the form of voice calls, text messages, internet access, and application usage. Mobile communications devices come in various forms, such as smartphones, tablets, laptop computers, IoT devices, wearable electronics (such as smart watches, smart rings, fitness trackers, smart glasses, smart clothing, smart jewelry, smart headphones, wearable digital assistants), and portable wireless hotspots. Depending on configuration and intended use, they may include features such as a touch-screen interface, a built-in camera, Wi-Fi, NFC, and/or Bluetooth connectivity, and GPS navigation.

Pairing may involve establishment of a wireless communications channel between two or more devices for enabling bidirectional data transfer. Pairing two devices may involve implementation of a discovery stage and a connection protocol. In some instances, pairing two devices together may include implementation of an authentication protocol. Some technologies for enabling pairing of two or more devices include Bluetooth and Near Fields Communication NFC) technology. For example, a user may pair a mobile communications device with at least one processor associated with a piece of exercise equipment (e.g., an exercise machine) during performance of physical exercise repetitions. The mobile communications device may receive signals from the paired processor indicative of exercise machine movement repetitions, process the signals, and present a gamified user interface for regulating (e.g., pacing) the user's physical exercise repetitions.

A sensor may refer to a device that outputs an electronic signal in response to detecting, sensing, or measuring a physical phenomenon. A sensor may convert a measurement of a physical phenomenon to a medium (e.g., an electronic medium) for receipt by at least one processor. A sensor may include one or more of a mechanical sensor, an optical sensor, a voltage and/or current sensor, a resistive sensor, a capacitive sensor, a motion sensor, a touch-sensitive sensor, a temperature sensor, a piezoelectric sensor, an ultrasound sensor, an audio sensor (e.g., a microphone), a Hall sensor, a thermocouple sensor, photoelectric sensor, a photoelectric encoder, a pressure sensor, and/or any other type of sensor that may be used to detect position, motion, displacement, vibrations, velocity, acceleration, and/or any other measurable property. In some embodiments, a motion sensor may include an inertial measuring unit (e.g., including one or more of a compass, accelerometer, and/or gyroscope), a positioning sensor (e.g., an indoor and/or outdoor positioning sensor), an encoder sensor, a potentiometer, a load cell, a laser displacement sensor, an inductive proximity sensor and/or any other device capable of outputting a signal indicative of physical movement.

An exercise machine, and/or exercise equipment may include a device, machine, and/or gear for assisting individuals in performing repeated physical activities aimed at improving fitness, strength, endurance, flexibility, and/or overall health. Exercise equipment may be designed to enable performance of recurring and/or repetitive motions. For example, a treadmill may enable a user to make repeated steps to run in place, and a weight machine may enable a user to repeatedly lift one or more weights.

An image sensor refers to a device capable of detecting and converting optical signals in the near-infrared, infrared, visible, and ultraviolet spectrums into electrical signals. Examples of image sensors may include digital cameras, phone cameras, semiconductor Charge-Coupled Devices (CCDs), active pixel sensors in Complementary Metal-Oxide-Semiconductor (CMOS), or N-type metal-oxide-semiconductor (NMOS, Live MOS). In some embodiments, an image sensor may be integrated with a transmitter for transmitting electric signals, associated with detected optical signals, to at least one processor.

A cable in the context of a mechanical portion of an exercise machine refers to an elongated piece of material employed for force resistance purposes. It may resist forces exerted by a weight stack or in the case of an electronic exercise machine, forces exerted by a motor. A cable may be in the form of a rope, chord, filament, band, or bundle. For example, a cable may include a bundle of fibers or wires such as metal (e.g., steel) capable of force resistance. The cable may be sufficiently flexible to permit winding around a spool and/or pulley system. A cable of a weight machine may have a first end connected to a spool and a second end connected to an accessory for maneuvering by a bodily limb and/or appendage (e.g., a hand, foot, arm, leg, shoulder, and/or neck). A cable may be connected to a resistance (e.g., a resistance motor and/or one or more weights via a pulley system located between the spool and the accessory permitting a user to lift and lower the weights via by maneuvering the accessory.

Movement of a cable (e.g., cable movement) may include motion of the cable as the cable is unwound from the spool (e.g., when a user exerts a force pulling on a cable to lift a weight or resist a motor) and as the cable is rewound on the spool (e.g., when the user releases the cable to reduce the resistance).

A spool on which a cable is wound may include a central core around which the cable is wound. It may include flanges on either end for preventing the cable from sliding off the central core. The central core may include a rounded or cylindrical structure. A portion of a cable may be wound around a spool while another off-spool portion of the cable may be routed through a pulley system and connected to an accessory of an exercise machine. Rotating a spool in a first direction (e.g., counter-clockwise) may cause a section of the cable to unwind from the spool, causing the off-spool portion of the cable to extend and/or lengthen. Rotating a spool in a second direction (e.g., clockwise) may take-up the off-spool section of cable causing the off-spool portion of the cable to retract and/or shorten. Thus, turning a spool may control the length of an off-spool section of a cable at any given point in time. When a user alternately exerts a force on and releases a cable of an exercise machine (e.g., when performing manual exercise repetitions), the spool may alternately turn clockwise and counter-clockwise (or the reverse), to alternately retract and extend the exposed part of the cable. Some disclosed embodiments may facilitate in regulating manual exercise repetitions performed by a user to cause the sections of cable that are wound and unwound around the spool during each repetition to be substantially the same (e.g., corresponding to a steady range of motion by the user). Some disclosed embodiments may facilitate in regulating manual exercise repetitions performed by a user such the alternate winding and unwinding motions of the spool occur at substantially regular time intervals (e.g., corresponding to a substantially regular frequency for the user's manual exercise repetitions).

A resistance motor may include one or more electromagnets configured to apply a variable electromagnetic field as resistance. The level of resistance generated by the resistance motor may correspond to an equivalent weight (e.g., "digital weight") for overcoming during the performance of a weight-bearing exercise. A resistance motor may be associated with at least one processor configured to control a level of electrical current flowing therethrough, allowing the at least one processor to control attributes associated with resistance or digital weight produced by the resistance motor. In some instances, a processor may dynamically adjust the resistance in response to a user input and/or data received from a sensor (e.g., as feedback to manual exercise movements by the user). Additionally or alternative, a resistance motor may operate in various modes, such as a constant (e.g., steady) resistance mode, an adaptive resistance mode, and/or according to a pre-programmed resistance profile. In some embodiments, a processor may receive control signals wirelessly from an external device, such as a mobile communications device and/or central control unit (e.g., a cloud server).

A resistance motor connected to a spool refers to a resistance motor mechanically coupled to the spool to exert rotational resistance on the spool. When a user pulls on a cable wound around the spool, the user may encounter resistance exerted by the resistance motor on the spool, requiring the user to exert greater force to displace the cable. In this way, a resistance motor may simulate weights of a weight machine. A resistance motor connected to a spool may refer to a resistance motor mechanically coupled to a spool configured to exert rotational resistance as the spool rotates. The spool may be mounted within a housing in a manner to permit rotation and may include a cable wound around a central core of the spool. When a user pulls on the cable, the spool may rotate in response to the pulling motion, causing the resistance motor to apply a variable or constant force opposing rotation of the spool, thereby simulating the effect of lifting weights, and/or overcoming a resistance. The mechanical coupling between the spool and the motor may be achieved via a direct drive, a gear assembly, a belt drive, and/or any other transmission mechanisms for transferring a rotational force from the motor to the spool. This may allow for controlled resistance levels that may be dynamically adjusted, for example, based on a user input and/or one or more profiles stored in memory.

Free weights may include strength training equipment for lifting absent attachment to a machine (e.g., via a cable). A free weight may lack fixation to a track, permitting a user to exert a broader range of motion when lifting a free weight than when lifting a weight associated with an exercise machine. Some examples of free weights may include dumbbells, barbells, kettle balls, weight plates, and/or wearable weights (e.g., ankle weights, wrist weights, and/or a weighted vest). Weights may include materials such as cast iron, steel, concrete, plastic, and/or rubber. Such free weights may be employed on a device (e.g., a Smith Machine) that guides the free weight motion and/or includes stops for preventing injury.

Gamifying a physical exertion session may alleviate negative user experiences associated with physical exertion, such as tediousness, boredom, stress, and/or fatigue. For example, a workout session involving multiple repetitive movements may become boring, causing a user to lose interest. A gamified physical exertion session may cause a user experience for an exercise routine to mimic user experiences typically associated with playing games (e.g., video games). For instance, a gamified physical exertion routine may include a display of colorful graphics and allocation of points and/or awards such that the user experience associated with completing multiple repetitive movements may be similar to a user experience associated with playing a video game. This may cause a user's motivation to complete such an exercise routine to be greater than for a similar exercise routine that is non-gamified. Additionally or alternatively, gamification of exercise routines may encourage a user to perform multiple repetitive movements at a desired pace, duration, and/or range of motion to achieve a fitness goal.

Some disclosed embodiments involve a non-transitory computer readable medium containing instructions that when executed by at least one processor causes the at least one processor to perform operations for gamifying a physical exertion session. A physical exertion session refers to a time period dedicated to structured bodily activity requiring an expenditure of energy and designed to engage one or more bodily parts in movement. A physical exertion session may be structured to improve physical fitness, health, and/or performance for other physical and/or mental activities, and may vary in intensity, duration, and type, depending on the goals and fitness levels of a participant. Some goals of a physical exertion session may include cardiovascular endurance, strength training, flexibility, muscles tone, and/or balance and coordination. A physical exertion session may include a plurality of repetitions, such as four sets of ten repetitions of squats, or three sets of twenty repetitions of bench presses. A game refers to an activity, undertaken for entertainment, fun, or competition. A game may involve rules, objectives, and/or challenges. One or more rules, objectives, and/or challenges may be designed to aid participants in achieving a goal. Activities that are game-like may be associated with increased motivation for engagement and/or completion than non-game-like activities. For example, a gamified exercise routine may introduce social, psychological, and/or cognitive factors encouraging sustained engagement. Such factors may include providing of immediate feedback and/or positive reinforcement for improved learning, and/or tracking of achievement and progression to satisfy a need for achieving competence, mastering a skill, and foster a sense of accomplishment. Such factors may additionally include providing an immersive and exciting environment to escape the drudgery of mundane and/or boring exercise repetitions. Gamified exercise routines may additionally introduce social engagement with other exercising users via multi-player modes to exploit team dynamics and/or competition for motivating users. To gamify may refer to the application of game-design elements and principles in a non-game context for the purpose of engaging participants, enhancing motivation, and encourage desired behaviors. Such game-design elements may include point scoring, a leaderboard ranking participants based on performance, badges for rewarding participants, challenges for motivating participants, and/or progress tracking to create a more interactive and rewarding experience. For example, a gamified physical exertion session may include game-design elements for motivating a participant to exert more energy and/or exercise for a longer period than a non-gamified physical exertion session. Gamifying a physical exertion session may help participants persist longer and perform more intensely during an exercise routine compared to a non-gamified physical exertion session. For instance, a physical exertion session may be gamified as a video game rendered on an electronic display, such that a user experience associated with performance of the physical exertion session is similar to a user experience associated with playing a video game.

Some disclosed embodiments involve receiving signals indicative of exercise equipment movement repetitions. Receiving may include retrieving, acquiring, or otherwise obtaining, e.g., information. Receiving may include reading data from memory, receiving information from a device (e.g., a sensor and/or computing device) via wired and/or wireless communications channel. At least one processor may receive signals (as described elsewhere herein) via wired and/or wireless communication links using synchronous and/or asynchronous communications protocol, for example by polling a memory buffer for data and/or by receiving data as an interrupt event. Movement repetitions may include a recurring and/or replicated motions, e.g., associated with a physical activity. Exercise equipment movement repetitions may include recurring motions of one or more pieces of exercise equipment (as described elsewhere herein) due to manipulations of some or all portions of the exercise equipment by a user performing an exercise routine. Exercise equipment movement repetitions may correspond to motions performed by a user while exercising. For example, a running belt of a treadmill may repeatedly rotate around a deck and rollers as a user walks and/or runs thereon, and a cable of a weight machine may repeatedly extend and retract as a user repeatedly lifts, pushes, and/or pulls on an associated weight. The pace at which exercise equipment movement repetitions are measured may correspond to the pace at which the user performs an exercise routine. Thus, tracking a pace associated with exercise equipment movement repetitions may permit tracking a pace at which a user performs an exercise routine using the exercise equipment. For example, one or more motion sensors may sense positions, directions, and/or velocities of a cable connected to a motor of an exercise machine over time. At least one processor may use such sensed data to track exercise repetitions over time. Signals indicative of exercise equipment movement repetitions may include information associated with exercise equipment movement repetitions. Such information may include, for example, a frequency, a timing, a duration, an intensity, a speed, a smoothness and/or a choppiness of motion, and/or a range of motion associated with performance of an exercise routine. For example, at least one motion sensor may be associated with a cable of a weight machine for detecting cable motion. As a weight connected to the cable is repeatedly lifted and lowered, the at least one motion sensor may detect the cable motion and transmit signals indicative of the cable movement to at least one processor. As another example, an image sensor may sense a free weight being raised and lowered by a user and transmit signals indicative of the free weight motion to at least one processor. Signals indicative of exercise equipment movement repetitions may include frequency, timing, duration, intensity, velocity, and/or range of motion. The capturing and analyzing of such data may be used to provide real-time feedback to a user.

In some disclosed embodiments, the signals correspond to at least one property of manual exercise movements. Manual exercise movements may include physical activities performed using natural body mechanics and/or muscle engagement. Some examples of manual exercise movements may include leg motions, arm motions, and/or torso (e.g., core) motions, neck and/or head motions, and/or any other type of bodily motions and/or combinations thereof. Such motions may include, for instance, pulling, pushing, lifting, lowering, releasing, pressing, kicking, bending, straightening, twisting, turning, squeezing, extending, retracting, and/or any other type of bodily motion. A property of manual exercise movements may refer to an attribute characterizing manual exercise movements. Such properties may include, for example, a number of repetitions, a frequency and/or pace associated with performance of repeated manual exercise movements, a speed and/or rate associated with performance of a particular manual exercise movement, a timing, duration, intensity, and/or range of motion for one or more manual exercise movements. Such properties may additionally include, for instance, one or more rest periods and/or pauses between manual exercise movements, a smoothness and/or a choppiness of motion (e.g., indicating muscle strain), and/or changes in exertion levels (e.g., an increase and/or decrease in weight lifted, in limb extension, in pauses between repetitions, and/or in a treadmill belt speed). For example, manual exercise movements performed by a user using a piece of exercise equipment may cause corresponding exercise equipment movement repetitions. At least one sensor may detect properties of the exercise equipment movement repetitions and transmit signals to at least one processor. The at least one processor may user the signals to determine corresponding properties of manual exercise movements performed by the user. Thus, tracking exercise equipment movement repetitions (e.g., using one or more sensors) may permit at least one processor to track manual exercise movements performed by a user.

In some disclosed embodiments, the at least one property of manual exercise movements includes at least one of a velocity associated with cable movement, an acceleration with cable movement, a cable displacement, or a cable position. Velocity refers to a rate of change of a position of an object with respect to time. Velocity may be measured as meters per second (mps), centimeters per second, millimeters per second, inches per second, and/or any other distance measure per unit of time. In some instances, a velocity may include a direction, e.g., indicated as a plus or minus sign. A velocity associated with cable movement refers to a rate at which a cable of an exercise machine may move as a user applies force on the cable, e.g., as the cable unwinds from a spool and extends in length in response to a pulling motion by a user and/or as the cable rewinds onto the spool and retracts in length in response to a release of the cable by the user. A velocity associated with cable movement may be based on a force applied to the cable (e.g., by a user), a counter-force or resistance applied in response to the force (e.g., by a weight or a resistance motor), and/or a pulley system associated with the cable. A velocity associated with cable movement may correspond to a velocity associated with a bodily motion of a user during a physical exertion session, e.g., how fast a user pulls and/or pushes on an accessory connected to the cable using one or more arms and/or legs. Acceleration refers to a rate of change of velocity with respect to time and may indicate if the velocity is increasing or decreasing. Acceleration of cable movement refers to a rate of increase or decrease in cable velocity, e.g., if the rate at which the cable moves increases or decreases. For example, if a user increases/decreases a speed for pulling and/or releasing a cable, the cable movement may accelerate/decelerate. For instance, achieving a fitness goal may involve lifting a weight at a faster rate, and releasing a weight at a slower rate, or the reverse, or performing a first set of repetitions at a slower rate and performing a second set of repetitions at a faster rate, or the reverse, and/or any combination thereof. At least one processor may apply a velocity and/or acceleration of cable motion to pace a user for achieving such a fitness goal. A cable displacement refers to a length of cable that moves in response to manual exercise movements. For example, a user grasping an end of a cable (e.g., using an accessory) may move her arm by a distance (e.g., 40 centimeters) in a pulling motion, causing displacement along the length of cable by the distance pulled (e.g., 40 centimeters) to lengthen the amount of cable unwound from a spool. When the user moves the arm back by a distance (e.g., 30 centimeters) in a releasing motion, the cable may be displaced by the distance released (e.g., 30 centimeters) to shorten the amount of cable unwound from the spool. In some instances, achieving a fitness goal may require extending and releasing a cable by the same distance, increasing and/or decreasing the extension and/or releasing of a cable over time (e.g., for different repetitions and/or exercise sets), and/or any combination thereof. At least one processor may apply a cable displacement when pacing a user to achieve such a fitness goal. A cable position refers to a relative position of a cable reference point. For example, a cable position may refer to a location of an end of a cable connected to an accessory at a given point in time. For example, when a user pulls on the end of the cable to lift a weight (or to otherwise resist a force) by extending/bending the arm/leg, the cable may be at a first position, and when the user releases the end of the cable to lower the weight by bending/extending the arm/leg, the cable may be at a second position. At least one processor may use the first and second positions to calculate a range of motion by the user for one or more exercise repetitions and determine if the range of motion corresponds to a recommended range for achieving an exercise goal.

By way of example, a user may repeatedly move one or more limbs (e.g., arms and/or legs) when performing a weightlifting routine using an exercise machine. The repeated limb motion may cause a cable of the exercise machine to repeatedly extend and retract, mimicking the limb motion (e.g., the associated cable may extend as the limb pulls on the weight, and retract as the limb releases the weight at a velocity and/or acceleration corresponding to the limb motion). At least one sensor associated with the cable may measure cable displacement during performance of the exercise routine and transmit signals to at least one processor. The at least one processor may analyze the signals to determine properties of the limb motions of the user. As another example, a user may repeatedly step on a belt of a treadmill. At least one sensor may detect belt displacement and transmit signals to at least one processor. The at least one processor may analyze the signals to determine properties associated with the steps of the user (e.g., speed, frequency, and/or step size).

Figure 2:
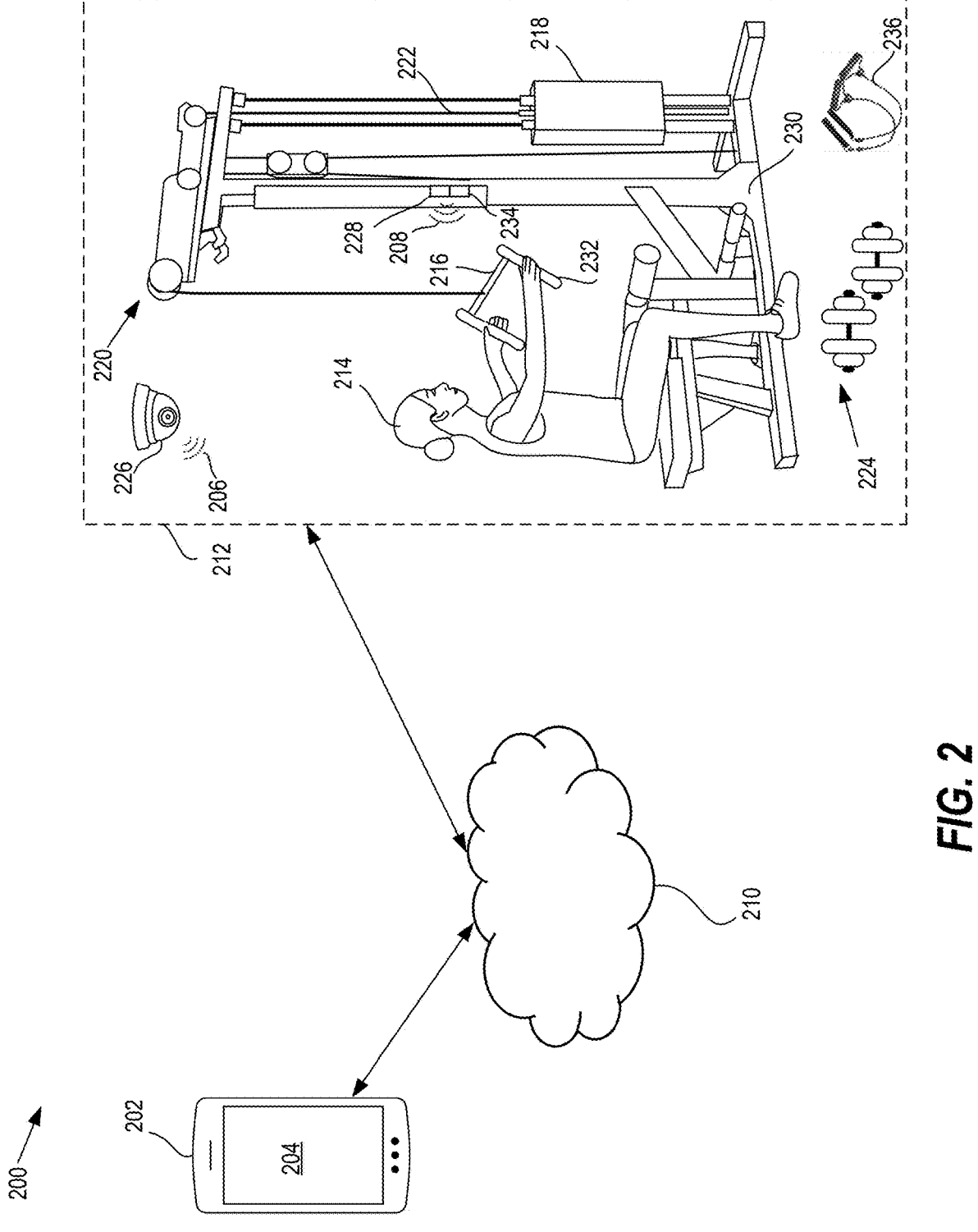
FIG. 2 illustrates a system for gamifying a physical exertion session, consistent with some disclosed embodiments.

By way of a non-limiting example, reference is made to FIG. 2 illustrating a system 200 for gamifying a physical exertion session, consistent with some disclosed embodiments. System 200 may include a mobile communications device 202 with a display 204. Mobile communications device 202 may correspond to computing device 100 of FIG. 1 (e.g., a first instance of computing device 100). For instance, display 204 may correspond to display 110. Mobile communications device 202 may receive signals from a transmitter 206 and/or a transmitter 208 via a network 210 indicative of exercise equipment movement repetitions associated with exercise equipment 212. Any of transmitters 206, 208 may correspond to transceiver 106 in FIG. 1. The signals may correspond to at least one property of manual exercise movements. In some embodiments, at least one property of manual exercise movements may include a velocity and/or acceleration and/or range of motion of cable movement (e.g., how fast, or slowly cable 506 unwinds from or rewinds onto spool 504 in FIG. 5). In some embodiments, at least one property of manual exercise movements may include cable displacement (e.g., how much of cable 506 has unwound or has rewound on spool 504), and/or cable position (e.g., a location of a portion of cable 506 at a given point in time). For instance, a user 214 may repeatedly pull and release an accessory bar 216 connected to one or more weights 218 of a weight stack of an exercise machine 220, causing an associated cable 222 to repeatedly extend and retract, accordingly. Thus, the signals indicative of movement repetitions of exercise machine 220 may correspond to at least one property of manual exercise movements as user 214 manually pulls and releases accessory bar 216. For instance, the signals may indicate the number of repetitions performed, the pace at which the repetitions are performed, rest periods between repetitions, a range of motion for each repetition, pauses during and/or in between repetitions, and any property of manual exercise movements.

In some disclosed embodiments, the exercise equipment includes a transmitter for transmitting the signals, and wherein the display is associated with a mobile computing device paired with the transmitter of the exercise equipment. A transmitter, mobile computing device, and a display may be understood as described elsewhere in this disclosure. Transmitting signals may include conveying information over a distance. Exercise equipment including a transmitter refers to a transmitter located in proximity to and/or connected to a piece of exercise equipment. In some instances, at least one sensor associated with an exercise equipment may be communicatively coupled with a transmitter. The sensor may sense data indicative of exercise movement repetitions cause by manual exercise movements. The transmitter may send signals encoding the data to at least one processor for analysis. A display associated with a mobile computing device may include a digital screen integrated with and/or otherwise communicatively coupled to a mobile computing device, allowing at least one processor associated with the mobile computing device to cause content to be presented on the display. A mobile computing device paired with the transmitter of the exercise equipment refers to a wireless connection established between the mobile computing device and the transmitter for the purpose of transferring data, as described elsewhere in this disclosure. By way of example, prior to performing a workout, a user may pair a mobile device to a transmitter coupled to a sensor associated with an exercise machine. During the workout, the sensor may detect repetitions of the exercise machine corresponding to physical (e.g., manual) exercise movements of the user. The transmitter may send signals indicative of the exercise machine repetitions to the mobile device. A processor associated with the mobile device may graphically present the exercise machine repetitions on an associated display, permitting the user to visually perceive his manual exercise movements.

In some disclosed embodiments, the exercise equipment includes free weights, and the signals correspond to an output of an image sensor arranged to detect movement of the free weights. An output of an image sensor (as described elsewhere in this disclosure) may include image data produced from electrical signals generated from optical signals. Such output may include pixel data streams, digital images, digital video streams, data derived from captured images, and data that may be used to construct one or more 3D images, a sequence of 3D images, 3D videos, or a virtual 3D representation. To detect may include to sense, perceive, discover, recognize, and/or identify. Movement of the free weights (as described elsewhere in this disclosure) may include motions of one or more free weights caused by a user lifting and/or lowering the free weights. Such movements may include squats, bench presses, deadlifts, bent-over rows, overhead presses, lunges, calf raises, bicep curls, triceps extensions, shoulder presses, and/or any other exercise using free weights. In some embodiments, movement using a free weight may include use of a wearable weight, and may include motions such as stepping, jumping, arm lifts, leg lifts, and/or any other bodily motion). An image sensor arranged to detect movement of the free weights may include an image sensor installed at a position, elevation, and/or orientation to enable capture of optical signals reflected from the free weights as the free weights are raised and/or lowered by a user.

In some disclosed embodiments, the exercise equipment includes a weight machine having a sensor for outputting the signals. A weight machine refers to a piece of exercise equipment designed to provide resistance through one or more cables. The cable(s) may be threaded through one or more pulleys and maybe connected to mechanical or electrical resistance (e.g., a weight stack or a motor) A weight machine may cause weights to follow a fixed path of motion, e.g., along a track. To lift a weight, a user may pull on the cable, and to lower the weight the user may release the cable. A weight machine having a sensor refers to a weight machine with an integrated detector (or a proximate detector) arranged for sensing motion, e.g., of an associated weight and/or cable as a user lifts and/or lowers the weight. Outputting may include transmitting and/or sending. For instance, the sensor of the weight machine may be coupled to a transmitter for sending signals indicative of the sensed motion to at least one processor. Some examples of sensors that may be included in a weight machine may include a force and/or load sensor (e.g., a strain gauge and/or load cell), a rotary and/or linear position sensor, a motion sensor (e.g., an accelerometer and/or gyroscope), a hear rate sensor, a proximity sensor, and/or an image sensor.

In some disclosed embodiments, the signals are derived from an image sensor. Derived refers to produced and/or generated from. Signal derived from an image sensor (as described elsewhere herein) may include image data generated by a camera and transmitted using an associated sensor. For example, an image sensor may be arranged to capture images of a free weight or a weight and/or an associated cable of a weight machine during a weightlifting exercise routine. The image sensor may capture light reflecting off the weight and/or cable and convert the reflected light to electric signals. The electric signals may be converted to electromagnetic signals for transmitting to at least one processor.

In some disclosed embodiments, the weight machine includes a cable, wherein the manual exercise movements correspond to movement of the cable, wherein the sensor is configured to detect the movement of the cable, and wherein the signals are indicative of the cable movement. A sensor configured to detect cable movement may refer to an optical, motion, and/or any other type of sensor associated with a cable (as described elsewhere herein) for sensing displacement of the cable. Signals detected by the sensor may be used to derive one or more properties associated with manual exercise movements. For example, optical signals (e.g., visible and/or IR light) reflecting off a cable may be detected as a series of images captured over time. At least one processor may user the series of images to determine a speed (e.g., cable displacement, velocity, and/or acceleration) of the cable as it moves in response to a pulling and/or releasing motion by a user. Similarly, signals outputted by a motion sensor associated with a cable may aggregated over time to determine cable motion corresponding to manual exercise movements. Movement of the cable (e.g., cable movement, as described elsewhere herein) may correspond to manual exercise movements by the user. For instance, as a user moves a limb to maneuver an accessory of a weight machine, displacement of the limb may cause a similar displacement of a cable connected to the accessory. Thus, tracking cable movement via a sensor associated with a weight machine may permit tracking manual exercise movements by the user during a weightlifting session.

In some embodiments, a sensor configured to detect cable movement may include an optical and/or rotation sensor associated with a spool around which a cable may be wound. The sensor may measure the rotation of the spool and transmit signals to at least one processor for conversion to a linear distance of cable displacement. The at least one processor may cause the linear movement of a controllable element displayed in a gamified user interface to be proportional to the distance of cable displacement. For example, a maximum cable displacement distance may correspond to the full width or full length of a display screen. At least one processor may determine a position of a controllable element along a first axis scaled in proportion to a linear distance that the cable is displaced off the spool in response to a user's pulling motion and/or rewound onto the spool in response to a user's releasing motion. As the user pulls/releases the cable, the controllable element may move linearly along the display screen. The first axis along with the controllable element moves may be calibrated so that a maximum linear cable displacement (corresponding to the user's full range of motion) aligns with the screen's width and/or length, ensuring that the user's full range of cable pull may map from one side of the screen to the other side of the screen.

By way of a non-limiting example, in FIG. 2, exercise equipment 212 may include transmitters 206 and/or 208 for transmitting signals. Display 204 may be associated with mobile computing device (e.g., mobile communications device) 202 paired with transmitters 206 and/or 208 of exercise equipment 212. In some embodiments, the exercise equipment may include a display (e.g., see display 512 of exercise machine 500 in FIG. 5). For example, at least one processor may cause a gamified exertion session to be displayed on display 512 and/or on display 204. In some embodiments, exercise equipment may include free weights 224 and the signals may correspond to an output of an image sensor 226 arranged to detect movement of free weights 224 (e.g., image sensor 226 may be coupled with transmitter 206). For example, at least one processor may compare images of an image sequence captured over time and apply one or more image processing techniques, such as frame differencing, optical flow, background subtraction, corner detection, object tracking, pixel displacement, real-world calibration, time interval calculations, trajectory estimations, acceleration computations, and/or activity recognition. In some embodiments, exercise equipment 212 may include a weight machine 220 having a sensor 228 for outputting the signals. For instance, sensor 228 may be coupled with transmitter 208. In some embodiments, the signals may be derived from image sensor 226. In some embodiments, weight machine 220 may include a cable 222, and the manual exercise movements may correspond to movement of cable 222. Sensor 228 may be configured to detect movement of cable 222, and the signals may be indicative of the cable movement.

In some disclosed embodiments, the sensor is configured to detect movement by sensing rotation of a spool on which the cable is wound. Rotating a spool on which a cable is wound (as described elsewhere in this disclosure) refers to turning a spool, e.g., clockwise, or counter-clockwise to alternately release and retract sections of cable exposed external to the spool. Sensing rotation of a spool may permit determining the extent by which the cable is extended and/or retracted, and which may correspond to manual movements by the user, pulling and/or releasing the cable via an accessory. A sensor configured to detect movement by sensing rotation of a spool may include an optical sensor, a motion sensor (e.g., a rotary and/or linear motion sensor), and/or any other type of sensor for detecting rotary motion. For example, an optical and/or magnetic encoder may track angular displacement of a rotor over time, a potentiometer may measure rotation by varying a resistance level, a Hall effect sensor may detect changes in a magnetic field from a rotating magnet connected to a spool, and a mechanical counter may use gears to track a number of spool rotations. At least one processor may convert an angular displacement of a rotating spool to a linear length of cable alternately wound or unwound from the spool (e.g., the length may be proportional to the number of spool rotations multiplied by a circumference of the spool and may account for a varying radius as layers of cable are wound and unwound from the spool). While causing rotation of a spool, a user may encounter rotational resistance (e.g., torque) exerted by one or more weights and/or by a resistance motor. In some disclosed embodiments, the sensor is an integral part of a resistance motor connected to the spool. A sensor that is an integral part of a resistance motor (as described elsewhere in this disclosure) refers to a sensor connected to, affixed nearby, embedded within and/or built-in to a resistance motor. A resistance motor connected to a spool may be understood as described elsewhere in this disclosure.

Figure 5:
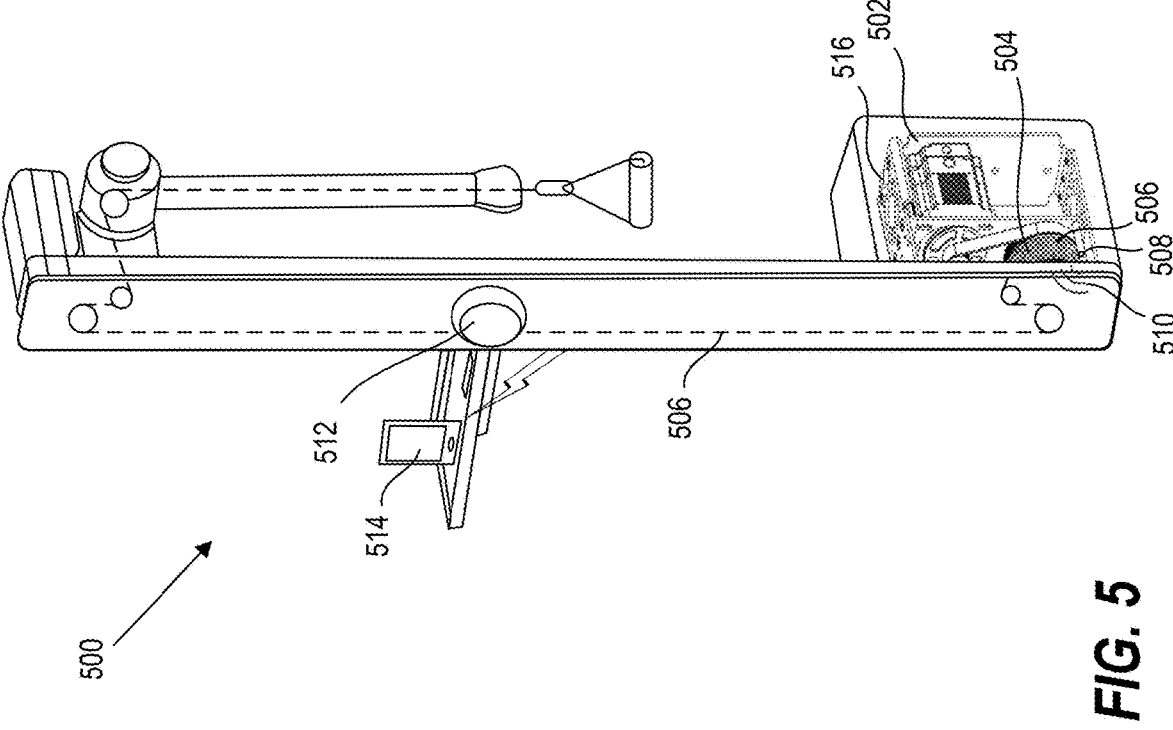
FIG. 5 illustrates an exemplary exercise machine including a resistance motor, consistent with some disclosed embodiments.

By way of another non-limiting example, reference is made to FIG. 5 illustrating an exemplary exercise machine 500 including a resistance motor 502, consistent with some disclosed embodiments. Resistance motor 502 may be connected to a spool 504 for supporting a cable 506 of exercise machine 500. Exercise machine 500 may include a sensor 508 (e.g., a motion sensor) for detecting movement by sensing rotation of spool 504 on which cable 506 is wound.

Sensor 508 may be an integral part of resistance motor 502 connected to spool 504. Exercise machine 500 may include display 512 for displaying one or more settings and/or available options for controlling exercise machine 500 (e.g., via a touch-sensitive screen). Display 512 may correspond to display 110 of FIG. 1. In some embodiments, display 512 may be associated with a dial for maneuvering mechanically to adjust one or more setting of exercise machine (e.g., by turning and/or pushing the dial). Exercise machine 500 may include at least one processor 516 (e.g., corresponding to processor 102 of FIG. 1) for controlling one or more of resistance motor 502, spool 504, cable 506, display 512, and/or any other controllable aspect of exercise machine 500. Processor 516 of exercise machine 500 may pair to a mobile device 514 (e.g., corresponding to mobile communications device 202 in FIG. 2). At least one processor (e.g., of mobile device 514 and/or processor 516 of exercise machine 500) may use display 512 to present data to a user of exercise machine 500. Such data may include, for example, a resistance setting, a number of repetitions performed, a mode, a gamified physical exertion session such as shown in FIGS. 3, 4, and/or 12, and/or any other data associated with exercise machine 500.

Some disclosed embodiments involve presenting via a display, a controllable element, the controllable element being movable along a first axis. Presenting may include displaying (e.g., information) visually in a manner to allow viewing by a user, e.g., by activating one or more pixels of an electronic display (as described elsewhere in this disclosure). Presenting information (e.g., visually) may include one or more of selecting a display medium, determining a layout, size, and/or style, selecting a display region (e.g., in association with a software application), selecting, setting, adjusting, activating and/or deactivating one or more pixels (or voxels) of an electronic display to visually present information to a user, activating one or more LEDs, LCDs and/or lasers (e.g., to project information on a wall), and/or any other action allowing information stored in memory to be visually perceived by a user. A controllable element may include a graphical visual component that may be manipulated via a digital interface to convey information. At least one processor may display a controllable element in response to signals received from a sensor and/or processor associated with exercise equipment, where the signals may correspond to manual exercise movements performed by a user. At least one processor may control one or more of a position, a size, a color, a saturation, a contrast, a transparency, a velocity, an acceleration, a direction, and/or any other display property for a graphical element displayed on an electronic display to cause the controllable element to mimic manual exercise movements. In this manner, a user of exercise equipment many control how a controllable element may be displayed by the at least one processor, e.g., if the user moves quickly/slowly causing a resistance linkage of the exercise equipment to move quickly/slowly, the at least one processor may cause the controllable element to move quickly/slowly, accordingly. A controllable element may take on any shape, such as a circle, oval, polygon (e.g., square, rectangle, triangle, hexagon), a star, an icon, an avatar, an animation, a target, and/or any other shape or form. In some embodiments, a controllable element may be associated with user motion, e.g., a user may control a display of a controllable element via motion such that the controllable element may mimic the user's movements. As the user raises and lowers a bodily appendage, the controllable element may similarly rise and fall, e.g., at a corresponding pace. This may permit the provision of feedback to the user, allowing her to visualize her manual exercise movements by tracking the motion of the controllable element on a digital screen. An axis refers to a visible or invisible reference line or reference direction along which or in which a component, element, or indicator may move. For example, an axis may define a relative position and/or distance, e.g., relative to a point on the axis. An axis may serve as a baseline for illustrating a position of an indicator and/or a relationship between two or more indicators and may define a spatial relationship of points along a particular dimension. In some instances, an axis may include notches and/or markings to indicate distance along the axis. A position of an indicator (e.g., a controllable element) along an axis may change with time. An axis may be oriented horizontally (e.g., from a left or right side of a display to the opposite, right or left side), vertically (e.g., from a top or bottom side of a display to the opposite, bottom, or top side), or at an angle (e.g., diagonally). Moveable refers to being capable of being relocated from a first position to a second position. A controllable element being movable along a first axis may refer to a graphical component, element, or indicator, that may be displayed at differing locations along a reference line, e.g., at different points in time to indicate motion. For example, a graphical visual component may be displayed at differing locations along a reference line over time for visually tracking manual exercise movements performed by a user (e.g., corresponding to exercise equipment movement repetitions) over time. A controllable element moving at a faster rate along an axis may correspond to a faster manual exercise movement, and the controllable element moving slower along the axis may correspond to a slower manual exercise movement. In some embodiments, a direction at which a controllable element moves along an axis may indicate a direction of a user's manual motion. For example, performance of a manual exercise motion to lift a weight may cause a controllable element to move in a first direction along an axis (e.g., bottom to top) and performance of a manual exercise motion to lower the weight may cause the controllable element to move opposite to the first direction (e.g., top to bottom), or the reverse. Thus, the controllable element may make a round-trip along an axis for each manual exercise repetition performed with exercise equipment.

Figure 3:
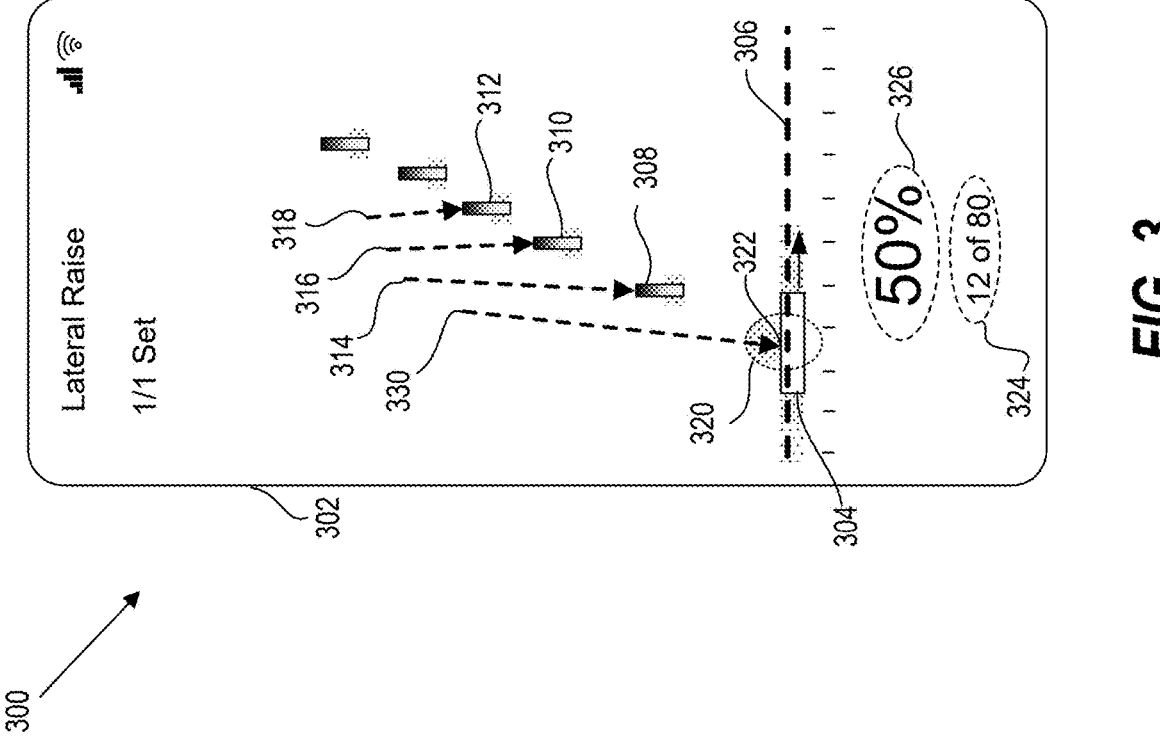
FIG. 3 illustrates an exemplary user interface for gamifying a physical exertion session, consistent with some disclosed embodiments.

By way of a non-limiting example, reference is made to FIGS. 2 and 3. FIG. 3 illustrates an exemplary user interface 300 for gamifying a physical exertion session, consistent with some disclosed embodiments. At least one processor (e.g., processor 102 of FIG. 1) may present via display 302, a controllable element 304. In some embodiments, display 302 may correspond to display 204 (FIG. 2) of mobile communications device 202 and/or display 110. In some embodiments, display 302 may be associated with a computing device other than mobile communications device 202, such as a computing device associated with exercise equipment 212 (e.g., display 302 may correspond to display 512 associated with processor 516 of exercise machine 500 in FIG. 5). Controllable element 304 may be movable along a first axis 306. In the example shown, as user 214 pulls on bar 216 of exercise equipment 212 (e.g., using handles 232), controllable element 304 may move from left to right.

Figure 4:
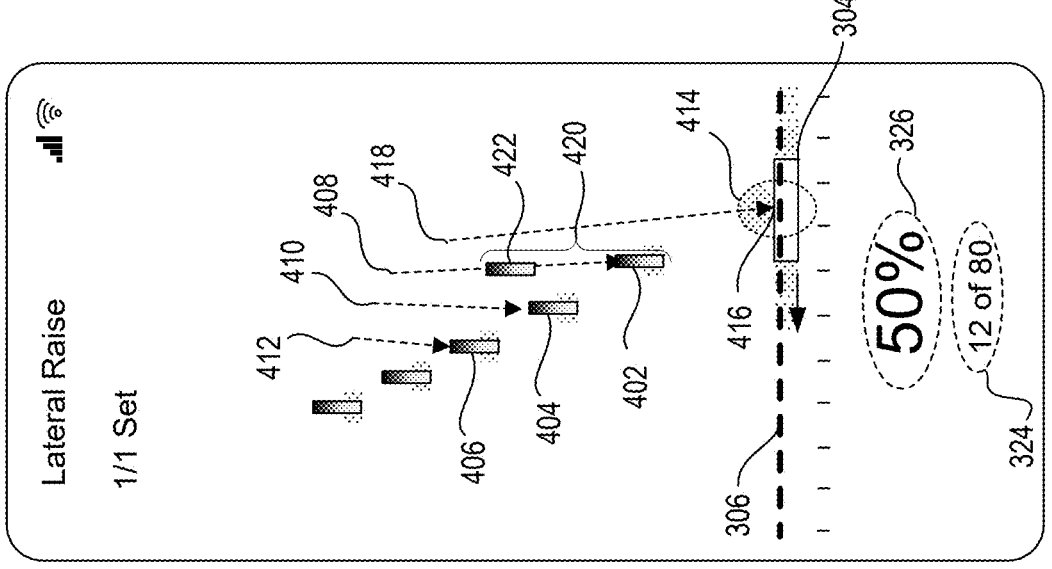
FIG. 4 illustrates view of the exemplary user interface of FIG. 3 for gamifying a physical exertion session, consistent with some disclosed embodiments.

By way of another non-limiting example, reference is made to FIG. 4, which is another view of exemplary user interface 300 for gamifying a physical exertion session, consistent with some disclosed embodiments. FIG. 4 is substantially similar to FIG. 3 with the notable difference that the direction of controllable element 304 along first axis 306 is opposite to that shown in FIG. 3, indicating a return along the path taken by controllable element 304 in FIG. 3. In the example shown in FIG. 4, as user 214 releases bar 216, controllable element 304 may move from right to left. As user 214 repeatedly pulls and releases bar 216, at least one processor may repeatedly display controllable element 304 moving from left to right (FIG. 3) followed by right to left (FIG. 4) along axis 306. The pace at which controllable element 304 moves along first axis 306 in FIGS. 3-4 may correspond to an actual pace at which user 214 repeatedly pulls and releases bar 216, e.g., to provide real-time feedback for the manual exercise movement of user 214 and corresponding repeated movements of exercise equipment 212. In some embodiments, the full length of first axis 306 may represent a desired range of motion for user 214, e.g., if user 214 underextends when pulling/releasing bar 216, controllable element 304 may fail to reach the right/left end of axis 306, and if user 214 overextends when pulling/releasing bar 216, a warning indicator may be presented, e.g., controllable element 304 may be displayed in a different color when reaching the right/left end of axis 306, and/or a vibration indicator may be emitted.

Some disclosed embodiments involve presenting via the display, a plurality of pacing elements movable along a plurality of second axes transverse to the first axis. A pacing element may include a graphical component, element, or indicator displayed for the purpose of regulating and/or guiding a user's a speed, frequency, pauses, and/or range of movement, e.g., when performing exercise repetitions. A pacing element may take on any shape (e.g., polygon, circle, oval, star, drop, icon, irregular form), color, and/or texture. In some instances, a pacing element may appear different than a controllable element, e.g., they may have different shapes, colors, sizes, textures, visual effects (e.g., glow, three-dimensional) to enable distinguishing therebetween. A plurality of second axes transverse to a first axis may refer to multiple reference lines (whether visible or invisible to a user) oriented transverse to and intersecting and/or crossing a first reference line (which may also be visible or invisible to a user). A plurality of second axes may be substantially perpendicular to a first axis or may intersect a first axis at angles other than 90° (e.g., more or less than 90°). A plurality of second axes may be substantially parallel or may be non-parallel. For instance, a plurality of second axes may fan out in one direction and converge in the opposite direction, e.g., like longitudinal lines of a map. A plurality of pacing elements movable along a plurality of second axes transverse to the first axis may refer to multiple graphical components, elements, or indicators displayed at differing locations over time along multiple reference lines crossing a first reference line. For example, the first axis may be aligned horizontally, and the pacing elements may appear as stars, drops, or missiles, each following a different trajectory along a different substantially vertically aligned second axis, each second axis intersecting the first axis at a differing location. Alternatively, the first axis may be aligned vertically, and the pacing elements may appear as balls, arrows, bullets, or flying creatures each following a different trajectory along a substantially different horizontally aligned second axis, each second axis intersecting the first axis at a different location (e.g., arranged top to bottom). As yet another example, the first axis may be aligned diagonally (e.g., from bottom left to top right) and the plurality of second axes may be aligned transversely diagonal to the first axis (e.g., from top left to bottom right), or the reverse, forming a plurality of 'X's connected along one branch.

In some disclosed embodiments, movement of the pacing elements corresponds to a desired pace of the exercise equipment movement repetitions. Movement of pacing elements refers to a motion and/or change of position of pacing elements over time. At least one processor may control the display of pacing elements to appear as though moving along the second axes at a particular speed. A desired pace of exercise equipment movement repetitions may refer to a target rate, speed, and/or frequency for performing exercise equipment movement repetitions, e.g., to achieve a fitness goal. Corresponds to refers to being representative of, associated with, and/or consistent with, e.g., the motion of the pacing elements along the second axes may be consistent with a targeted speed for performance of exercise repetitions. At least one processor may increase/decrease the speed of the pacing elements along the second axes to visually guide a user to increase/decrease the speed of manual exercise repetitions, accordingly. The timing and locations of the pacing elements incident along the first axis may serve as markers and/or gauges for timing and locating the controllable element along the first axis. For instance, incidence of a first pacing element on the first axis at a first location at a first time instance may serve as an indication to a user to maneuver exercise equipment to cause a controllable element, tracking the user's motion, to be positioned at the first location at the first time instance. Similarly, incidence of a second pacing element on the first axis at a second location at a second time instance may indicate to the user to maneuver the piece of exercise equipment to cause the controllable element to be positioned at the second location at the second time instance. Thus, movement of the pacing elements may permit a user to predict locations and timing for incidences of the pacing element along the first axis. The user may use the predictions to pace performance of manual exercise movements to cause a controllable element, tracking the user's manual exercise movements, to coincide with the actual incidences of the pacing elements along the first axis. This process may be repeated any number of times, e.g., causing pacing element to coincide with the first axis from left to right and from right to left, permitting the user to pace a series of manual exercise repetitions via a gamified user interface.

By way of a non-limiting example, in FIG. 3, at least one processor (e.g., processor (e.g., processor 102 of FIG. 1) may present via display 302, a plurality of pacing elements 308, 310, and 312 movable along a plurality of second axes 314, 316, and 318, respectively. Second axes 314, 316, and 318 may be transverse to first axis 306, causing pacing elements 308, 310, and 312 to coincide with first axis 306 at different times and at locations. For instance, as controllable element 304 moves along first axis 306 from left to right, pacing element 308 may coincide with first axis 306 earlier and further to the left than pacing element 310, which may coincide with first axis 306 earlier and further to the left than pacing element 312. Similarly, in FIG. 4, at least one processor may display a plurality of pacing elements 402, 404, and 406 movable along a plurality of second axes 408, 410, and 412, respectively transverse to first axis 306, causing pacing elements 402, 404, and 406 to coincide with first axis 306 at different times and at locations (e.g., as controllable element 304 moves along first axis 306 from right to left, pacing element 402 may coincide with first axis 306 earlier and further to the right than pacing element 404, which may coincide with first axis 306 earlier and further to the right than pacing element 406). The movement of pacing elements 308, 310, and 312 (FIG. 3) and pacing elements 402, 404, and 406 (FIG. 4) may correspond to a desired pace of the exercise equipment movements. For instance, the times and locations at which pacing elements 308, 310, and 312, and 402, 404, and 406 coincide with first axis 306 may serves as guidelines and/or hints for controlling the movement of controllable element 304 along first axis 306, thereby serving as guidelines and/or hints for performing manual exercise movements.

Figure 6:
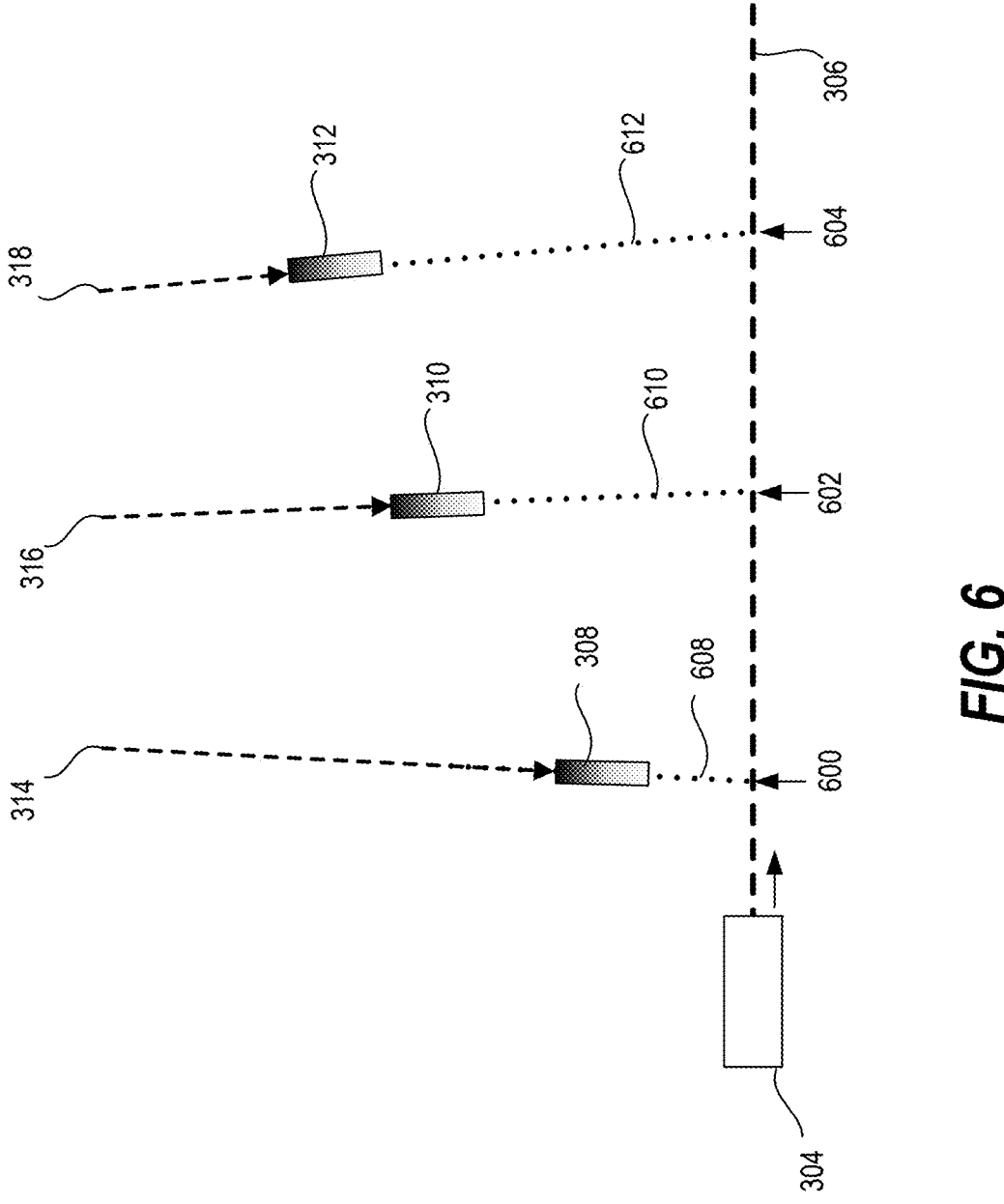
FIG. 6 illustrates how a user interface for a gamified physical exertion session may be used for pacing manual exercise movements, consistent with some disclosed embodiments.

By way of a non-limiting example, reference is made to FIG. 6 illustrating how a user interface for a gamified physical exertion session may be used for pacing manual exercise movements, consistent with some disclosed embodiments. User 214 may observe pacing elements 308, 310, and 312 moving along trajectories associate with second axes 314, 316, and 318, e.g., at a steady rate, to predict where and when pacing elements 308, 310, and 312 may be expected to coincide with first axis 316. For instance, user 214 may extrapolate trajectories 608, 610, and 612 for pacing elements 308, 310, and 312, respectively. Based on extrapolated trajectories 608, 610, and 612, user 214 may predict that pacing element 308 may coincide with first axis 306 at a first location 600 at a first time instant, pacing element 310 may coincide with first axis 306 at a second location 602 at a second time instant, and pacing element 312 may coincide with first axis 306 at a third location 604 at a third time instant. User 214 may use the predictions to maneuver bar 216 of exercise machine 220 at a pace to cause controllable element 304, tracking the manual exercise movements of user 214, to be positioned at first location 600 at the first time instant, at second location 602 at the second time instant, and at third location 604 at the third time instant, thereby causing three consecutive collisions between controllable element 304 and pacing elements 308, 310, and 312.

In some disclosed embodiments, the control element is a horizontally movable object, and the pacing elements are simulations of vertical falling objects. Horizontally may refer to sideways and/or extending across a width. A horizontally movable object may include a graphical element that may change position along a horizontal axis over time, e.g., by moving from left to right or by moving from right to left. A simulation may include a computer-generated reproduction and/or imitation of a real world phenomena. A vertical falling object may include an element dropping and/or descending downwards, e.g., simulation of gravitational effect or propulsive effect. A vertical falling object may have a shape similar to a bar, a raindrop, a snowflake, a fruit, candy, a missile, an exercise weight, a ball, a stone, an arrow, a parachute, and/or any other icon or image. For example, as a user moves a piece of exercise equipment at a particular speed, at least one sensor associated with the exercise equipment may transmit signals corresponding to the particular speed to at least one processor. The at least one processor may use the signals to display a graphical control element moving across a digital screen (e.g., from left to right) at the particular speed, thereby visually tracking actual motion of the user along a horizontal axis. Simultaneously, the at least one processor may display multiple pacing elements on the digital display descending downwards from the top to the bottom of the digital screen. The rate at which the pacing elements descend and reach the horizontal axis may correspond to a target pace for the user to move the piece of exercise equipment.

In some disclosed embodiments, the horizontally movable object is a paddle. A paddle may include a moveable graphical element for interacting with other graphical elements. A paddle may include a polygon shape (e.g., a square, a rectangle, triangle, a hexagon, an octagon) a circle, an oval, and/or any other two-dimensional or three-dimensional shape. In some instances, a paddle may mimic a physical paddle such for playing table tennis and/or water sports. A paddle may be shaped for interacting with another graphical element, e.g., to mimic a catching and/or hitting action. For example, in a two-dimensional simulation, a paddle may include an elongated portion allowing for interactions with a graphical element anywhere along the elongated portion, and in a three-dimensional simulation, a paddle may include a broad and/or flat portion for interacting with a graphical element anywhere within the broad and/or flat portion.

By way of a non-limiting example, in FIGS. 3-4, in some disclosed embodiments, controllable element 304 may be a horizontally movable object (e.g., along horizontally aligned first axis 306), and pacing elements 308, 310, 312, 402, 404, and 406 may be simulations of vertical falling objects. For example, controllable element 304 may have a flat portion similar to a flat portion of a paddle having a sufficient surface area relative to pacing elements 308, 310, 312, 402, 404, and 406 to facilitate collisions therebetween (e.g., just as a ping pong paddle may have a sufficient surface area relative to a ball to facilitate collisions with the ball).

Some disclosed embodiments involve regulating movement of the controllable element along the first axis in a manner corresponding to the speeds of the manual exercise movements. Regulating may include controlling, synchronizing, adjusting, and/or coordinating. Regulating movement of a controllable element along a first axis may include controlling and/or adjusting a display of a graphical component at differing locations along the first axis to depict motion. Speeds of manual exercise movements may include rates and/or paces (e.g., displacement per time unit, velocities, accelerations, and/or decelerations) at which a user physically maneuvers a piece of exercise equipment and/or at which a cable connected to a user-engaging element of exercise equipment moves in response to a user's exercise motions. At least one processor may use signals indicative of exercise equipment movement repetitions to cause a controllable element to move along a first axis at a rate substantially synchronous with a rate at which a user performs corresponding manual exercise movements. If the user performs the manual exercise movements at a slower pace, at least one processor may cause the controllable element to move at a correspondingly slower rate along the first axis. If the user performs the manual exercise movements at a faster pace, at least one processor may cause the controllable element to move at a correspondingly faster rate along the first axis, thereby mimicking the manual exercise movements of the user. Thus, at least one processor may cause a controllable element to move along a first axis in a manner reflective of actual motion by a user manually operating exercise equipment for performing exercise repetitions.

By way of a non-limiting example, in FIGS. 3-4, at least one processor (e.g., processor 102 of FIG. 1) may regulate movement of controllable element 304 along first axis 306 in a manner corresponding to the speeds of manual exercise movements. Thus, in FIG. 3, if user 214 pulls accessory bar 216 quickly/slowly, at least one processor 102 may cause controllable element 304 to move correspondingly quickly/slowly (e.g., from left to right) along first axis 306. Similarly, if user 214 releases accessory bar 216 quickly/slowly, at least one processor 102 may cause controllable element 304 to move correspondingly quickly/slowly (e.g., from right to left) along first axis 306, thereby tracking and/or mimicking actual manual motions performed by user 214.

Some disclosed embodiments involve determining collisions between the controllable element movable along the first axis and the plurality of pacing elements movable along the plurality of transverse second axes. Determining refers to arriving at a conclusive outcome. It may include, for example, undertaking an equality comparison to check whether two values are the same or are in a predetermined range. For example, the check may involve an equality operator like == in many languages (e.g., Python, JavaScript, C++). If the values are the same, the comparison evaluates to true; otherwise, it evaluates to false. Determining may additionally or alternatively include making a measurement, comparison, estimation, and/or calculation to arrive at a conclusive outcome. A collision refers to elements coinciding in space. If portions of two graphical elements occupy a sample location or immediately adjacent locations in space, a collision is said to occur. For example, if a graphical element is next to or attempts to occupy a location of at least one pixel that another graphical element occupies or attempts to occupy, a collision may be said to have occurred. Similarly, if two graphical elements are a trajectory to occupy the same space, a collision may be said to occur when the graphical elements are within a threshold collision distance from each other. Thus a collision may be said to occur when two graphical elements overlap at least partially; occupy adjacent areas (e.g., within a threshold distance); are on a trajectory to collide and are within a threshold distance; are in close proximity (by a threshold value); and/or appear to touch. A collision may involve crossing a distance threshold when displaying a graphical representation of a pacing element and a graphical representation of a controllable element such that the distance separating the controllable element and the pacing element is less than predefined number pixels (e.g., 10 pixels) for a predefined time period (e.g., at least 0.1 sec). Displayed thus, the controllable element and the pacing element may appear to touch or at least partially overlap for at least the predefined time periods. Determining a collision may involve monitoring locations of a controllable element simultaneously with monitoring a location of one or more of a plurality of pacing elements over time to discern when a location of the controllable element at least partially coincides and/or overlaps with a location of one of the pacing elements. In some embodiments, determining a collision may include determining proximity of a controllable element to a pacing element within a range (e.g., measured in pixels, voxels, inches, and/or millimeters). For instance, a controllable object may be shaped as a basket or a crate for catching one or more colliding pacing elements. Alternatively, a controllable object may be shaped as a hoop or target for intercepting one or more colliding pacing elements.

Some disclosed embodiments involve upon determination of a collision, causing a collision indication to appear on the display. Upon determination of a collision refers to any one of the alternative descriptions of a collision above. A collision indication refers to a visual or data-based cue that provides information about the occurrence of a collision. Such an indication may be visual or auditory for example. It can include a graphical indication illustrating the collision at the location of the collision, and/or a sound cue. For example, a collision indication may include displaying one or more graphical elements in an enlarged and/or highlighted (e.g., glow and/or three-dimensional) format, causing one or more graphical elements to jitter and/or vibrate, changing a color, brightness setting, and/or apply any other visual and/or auditory change. In some embodiments, a collision may be additionally indicated using audio haptic feedback. For example, a motor of an exercise machine may operate to send haptic feedback through the cable to the body of a user. Causing a collision indication to appear on the display may refer to performance of one or more of activating, deactivating, adjusting, and/or modifying settings of selected pixels and/or voxels on a digital display visually present the collision indication.

In some disclosed embodiments, the collision indication occurs at a transverse intersection of the controllable element and a colliding pacing element. Occurs refers to a time and/or location where an event (e.g., a collision) takes place. A transverse intersection of two elements may refer to a first of the two elements crossing and/or cutting a path of the second of the two elements. For example, two elements may move along non-parallel trajectories such that the trajectories coincide and/or cross, causing the two element to collide on a display as discussed earlier. A colliding pacing element refers to one of the plurality of pacing elements coinciding as discussed earlier. For instance, when a trajectory of a controllable element intersects a trajectory of a colliding pacing element, e.g., such the controllable element coincides with the colliding pacing element, at least one processor may mark the location of the coincidence by changing a display attribute of the location, e.g., using a different color, intensity, saturation, and/or any other display attribute for visually distinguishing the location of the collision from other regions on the display. For instance, the locations of the collisions may appear to glow, become brighter, sparkle, shine, explode, pop, and/or burst. In some embodiments, a pacing elements colliding with a controllable element may be displayed by replacing the colliding pacing elements and/or the controllable element with a collision indication. In some embodiments, a pacing elements colliding with a controllable element may cause a pacing element to be superimposed on a controllable element, or the reverse. In some embodiments, a pacing element colliding with a controllable element may be displayed by illustrating the controllable element consuming, shattering, and/or dissolving the pacing element. In some embodiments, a pacing elements colliding with a controllable element may be displayed by illustrating the controllable element shrinking and/or fading with each collision (e.g., thereby tracking the progress of the manual exercise movements), such that cumulative collisions with pacing elements may cause the controllable element to disappear, e.g., once an exercise goal is achieved.

By way of a non-limiting example, in FIGS. 3-4, at least one processor (e.g., processor 102 of FIG. 1) may determine collisions between controllable element 304 movable along first axis 306 and plurality of pacing elements 308 and 310 movable along plurality of transverse second axes 316 and 318, respectively (FIG. 3), and plurality of pacing elements 402 and 404 movable along plurality of transverse second axes 408 and 410, respectively (FIG. 4). Upon determining a collision, the at least one processor may cause a collision indication to appear on the display, e.g., in FIG. 3, a collision indication 320 may indicate a first collision between a pacing element (not shown) incident on first axis 306 and controllable element 304, and in FIG. 4, a collision indication 414 may indicate a second collision between a pacing element (not shown) incident on first axis 306 and controllable element 304. In some embodiments, collision indications 320 and 414 may occur at transverse intersections 322 and 416 of controllable element 304 and a colliding pacing element (not shown). Transverse intersections 322 and 416 may correspond to intersections between second axes 330 and 418, tracing trajectories for colliding pacing elements, and first axis 306. In some embodiments, collision indications 320 and 414 may replace a graphical representation of a pacing element colliding with controllable element 304

(e.g., only controllable element 304 may be displayed concurrently with one of collision indications 320 and 414).

In some disclosed embodiments, a first subset of the plurality of pacing elements, including at least two of the plurality of pacing elements, move along a common one of the plurality of second axes. A subset may include a portion of a group, e.g., less than every member of a group. At least two of the plurality of pacing elements move along a common one of the plurality of second axes refers to at least two pacing elements following a common trajectory aligned with one of the second axes, e.g., a second pacing element may trace a path along one of the second axes previously traced by a first pacing element. For example, a user interface may include a plurality of trajectories for a plurality of pacing elements, each trajectory aligned along a different one of the second axes. The user interface may additionally include a trajectory for a controllable element (e.g., tracking manual exercise movements) aligned along a first axis (e.g., transverse to the plurality of second axes). The second axes may be arranged to intersect the first axis, such that pacing elements following trajectories aligned with the second axes encounter the first axis at different locations along the first axis. However, some of the pacing elements may follow the same trajectory along the same second axis, causing those pacing elements to encounter the first axis at the same location at different times. This may provide an alternative pace for regulating the user's exercise movements. If the controllable element moves faster along the first axis (e.g., due to a faster manual exercise movement), the controllable element may collide with a first one of the pacing elements following the common trajectory, and if the controllable element moves slower along the first axis (e.g., due to a slower manual exercise movement), the controllable element may collide with a second one of the pacing elements following the common trajectory. In some embodiments, at least one processor may monitor which pacing element collides with the controllable element, e.g., to determine a score for an exercise routine. For instance, causing a collision with the first pacing element along a common trajectory may yield more points than causing a collision with the second pacing element along the common trajectory.

In some disclosed embodiments, each of a second subset of the plurality of pacing elements move along a differing one of the second axes. At least some of the pacing elements may follow differing trajectories, each aligned with a differing second axis. Each of the second axes may be associated with at least one pacing element tracing a path thereon. The timing of the encounters of the pacing elements moving along the second axes with the first axis may pace a user performing manual exercise movements. For instance, the user may maneuver a piece of exercise equipment to cause a controllable element to move along the first axis at a speed in a manner to collide with pacing elements moving along the second axes, transverse to the first axis. The rate at which the pacing elements encounter the first axis may thus correspond to the desired pace for the manual exercise movements.

By way of a non-limiting example, in FIG. 4, a first subset 420 of plurality of pacing elements 402, 404, 406, and 422, including at least two of the plurality of pacing elements (e.g., pacing elements 402 and 422) may move along second axis 408 (e.g., the same and/or common axis) of plurality of second axes 408, 410, 412, and 418. Pacing elements 402 and 422 may thus intercept first axis 306 at the same location but at different times, permitting user 214 to choose whether to cause controllable element 304 to collide with pacing element 402 at a first time or whether to collide with pacing element 422 at a second time. Causing controllable element 304 to collide with pacing element 402 at the first time may yield a first score, whereas causing controllable element 304 to collide with pacing element 422 at the second time may yield a second score. Pacing elements 402 and 422 moving along common trajectories may thus provide user 214 with more than one possible pace for performing an exercise routine. In some embodiments, each of a second subset of the plurality of pacing elements (e.g., pacing elements 404 and 406) may move along a differing one of the second axes (e.g., axes 410 and 412). In this case, user 214 may be offered only one pace for performing a manual exercise movement. In some embodiments, a user interface for a repetitive exercise routine may display multiple pacing elements moving along a common second axis for both directions of the repetitive exercise routine, e.g., providing the user with alternative paces for both directions of manual exercise movements. In some embodiments, a user interface for a repetitive exercise routine may display multiple pacing elements moving along a common second axis for only one direction of the repetitive exercise routine, e.g., providing the user with an alternative pace for only one direction of manual exercise movements.

In some disclosed embodiments, the operations further include tallying a score based on a number of determined collisions. Tallying a score refers to calculating, summing, and/or aggregating points and/or goals. A number of determined collisions refers to a quantity of encounters between a controllable element moving along a first axis (e.g., tracking a pace of manual exercise movements of a user) and the pacing elements moving along a plurality of second axes. At least one processor may cause the pacing elements to coincide with the first axis at different locations at different times, each location corresponding to a differing one of the second axes. This may guide the user to regulate the pace of the manual exercise movements to cause the controllable element (tracing the manual exercise movements) to collide with the pacing elements as they coincide with the trajectory of the controllable element. For example, the interface may assist the user in regulating the manual exercise movements to cause a collision at each point of intersection between the plurality of second axes and the first axes (e.g., causing the controllable element to collide with a pacing element at each location along the first axis intersecting with one of the second axes).

In some disclosed embodiments, the tallied score includes a numerical indication of a number of determined collisions. A numerical indication of a number of determined collisions refers to a net and/or total count of collisions, displayed using a numerical symbol. For example, a high number of collisions may indicate that the user is performing the manual exercise repetitions at a correct and regular pace, whereas a low number of collisions may indicate that the user is performing the manual exercise repetitions either too fast, too slow, or irregularly.

By way of a non-limiting example, in FIG. 3, at least one processor (e.g., processor 102 of FIG. 1) may tally a score 324 based on a number of determined collisions (e.g., illustrated by collision indicator 320). Tallied score 324 may include a numerical indication of a number of determined collisions. For instance, to achieve a perfect score, user 214 may need to cause controllable element 304 to collide with each one of pacing element 308, 310, and 312 along first axis 306. In some embodiments, at least one processor may additionally display a progress indicator 326 showing how much of an exercise routine has been completed (e.g., as a percentage, progress bar, icon, gauge, dial, and/or any other progress indicator). In some embodiments, tallied score 324 may be shared with additional users and/or may be published on a public or semi-public forum.

Some disclosed embodiments may involve a strike-out mode for a gamified physical exertion session. In a strike-out mode, at least one processor may detect each time a user fails to cause a collision between a controllable element and a pacing element (e.g., by failing to maneuver the exercise equipment at a desired pace) and record each such failure as a strike. After a threshold number of strikes are tallied (e.g., after three strikes are detected), at least one processor may terminate the gamified physical exertion session. In some embodiments, at least one processor may present a warning after each failure, e.g., "Strike 1", "Strike 2", and "Strike 3". In some embodiments, at least one processor may present a total sum of failures detected thus far during the gamified physical exertion session, e.g., by presenting an 'X' after the first detected failure, two 'X's after the second detected failure, and so one. In some embodiments, upon terminating a gamified physical exertion session, at least one processor may present an indication of the termination (e.g., "Game Over").

Some disclosed embodiments may involve dynamically increasing/decreasing a difficulty level as performance of a gamified physical exertion session progresses. For instance, when an exercise routine is performed using a resistance motor, at least one processor may automatically increase/decrease a resistance force exerted on an associated cable (e.g., an electronic weight) after a threshold number of repetitions are detected (e.g., after each repetition, the resistance level may increase/decrease by one kilogram). Additionally or alternatively, at least one processor may increase/decrease the speed of the pacing elements approaching the first axis. In some disclosed embodiments, the increase/decrease in difficulty may be presented graphically via a user interface. For example, one or more pacing elements and/or a controllable element may be presented differently, e.g., using a different color, texture, size, and/or visual effect to visually depict an increase/decrease in difficulty level.

In some disclosed embodiments, a metric for measuring progress in a gamified physical exertion session may include a number of collisions detected between a controllable element and a plurality of pacing elements. In some disclosed embodiments, a number of collisions detected between a controllable element and a plurality of pacing elements may replace other (e.g., non-gamified) metrics for measuring progress for a physical exertion session (e.g., such as a percentage and/or progress bar). Presenting a total number of collisions may emphasize the user's achievements and may increase the user's motivation to continue exercising over a non-gamified metric, such as a percentage, which may emphasize what the user still has to achieve.

Some disclosed embodiments may involve adapting a user interface for gamifying a physical exertion session for additional exercise routines, e.g., other than repetitive exercise routines performed using weights. For example, the embodiments disclosed herein may be used to pace a user performing a physical exertion session involving running, walking, swimming, cycling, performance of sit-ups, push-ups, chin-ups, squats, and/or any other type of exercise routine. Such physical exertion sessions may be performed lacking exercise equipment, e.g., using a motion sensor to count a user's bodily motions (e.g., steps, strokes, bends, extensions) over time. For instance, the gamified physical exertion sessions disclosed herein may be implemented using a smartwatch and/or smart glasses while walking, running, or performing any other repetitive exercise movement lacking exercise equipment.

FIG. 7 is a flowchart of example process 700 for gamifying a physical exertion session, consistent with embodiments of the present disclosure. In some embodiments, process 700 may be performed by at least one processor (e.g., processor 102 in FIG. 1) to perform operations or functions described herein. In some embodiments, some aspects of process 700 may be implemented as software (e.g., program codes or instructions) that are stored in a memory (e.g., memory 104) or a non-transitory computer readable medium. In some embodiments, some aspects of process 700 may be implemented as hardware (e.g., a specific-purpose circuit). In some embodiments, process 700 may be implemented as a combination of software and hardware.

Referring to FIG. 7, process 700 may include a step 702 of receiving signals indicative of exercise equipment movement repetitions, the signals corresponding to at least one property of manual exercise movements. By way of a non-limiting example, in FIG. 3, at least one processor (e.g., processor 102 in FIG. 1) may present via display 204 (FIG. 2), controllable element 304 movable along first axis 306.

Process 700 may include a step 704 of presenting via a display, a controllable element, the controllable element being movable along a first axis. By way of a non-limiting example, in FIG. 3, at least one processor may present controllable element 304 via display 204 (FIG. 2). Controllable element 304 may be movable along first axis 306.

Process 700 may include a step 706 of presenting via the display, a plurality of pacing elements movable along a plurality of second axes transverse to the first axis, wherein movement of the pacing elements corresponds to a desired pace of the exercise equipment movement repetitions. By way of a non-limiting example, in FIG. 3, at least one processor may present via display 204, plurality of pacing elements 308, 310, and 312 movable along plurality of second axes 314, 316, and 316, respectively, transverse to first axis 306. Movement of pacing elements 308, 310, and 312 may correspond to a desired pace of the exercise equipment movement repetitions.

Process 700 may include a step 708 of regulating movement of the controllable element along the first axis in a manner corresponding to the speeds of the manual exercise movements. By way of a non-limiting example, in FIG. 3, at least one processor may regulate movement of controllable element 304 along first axis 306 in a manner corresponding to the speeds of the manual exercise movements (e.g., see user 214 performing manual exercise movements using bar 216 in FIG. 2).

Process 700 may include a step 710 of determining collisions between the controllable element movable along the first axis and the plurality of pacing elements movable along the plurality of transverse second axes. By way of a non-limiting example, in FIGS. 3-4, at least one processor may determine collisions (e.g., indicated by collision indications 320 and 414) between controllable element 304 movable along first axis 306 and plurality of pacing elements 308, 310, and 312 movable along the plurality of transverse second axes 314, 316, and 316, respectively and plurality of pacing elements 402, 404, and 406, movable along the plurality of transverse second axes 408, 410, and 412, respectively.

Process 700 may include a step 712 of, upon determination of a collision, causing a collision indication to appear on the display. By way of a non-limiting example, in FIG. 3, upon determination of a collision, at least one processor may cause collision indication 320 to appear on display 204.

Some disclosed embodiments involve an exercise machine configured for pairing with a mobile communications device in order to permit the mobile communications device to be used as a gamification display for regulating usage of the exercise machine. The terms "exercise machine," "pairing," and "mobile communications device" may be understood as described elsewhere in this disclosure. Regulating usage of an exercise machine refers to guiding, pacing, and/or monitoring exertions activities performed using an exercise machine. For instance, regulating usage of an exercise machine may include modifying or guiding how fast or slow a user maneuvers a portion of the exercise machine, introducing and/or removing pauses during an exercise routine, lengthening and/or shortening one or more pauses, increasing and/or decreasing a range of motion, modifying a number of repetitions per exercise set, modifying a number of sets within an exercise routine, modifying one or more types of exercises included in an exercise routine, modifying a resistance level, and/or making any other change and/or adjustment to performance of an exercise routine. A gamification display may refer to a visualized presentation of data contextualized as a game, tournament, and/or competition for providing feedback, motivation, and/or guidance to perform one or more (e.g., exercise) activities. For example, at least one processor may use a display of a mobile communications device paired to a transmitter of an exercise machine to present a user interface for interacting with and/or receiving feedback from the exercise machine during a physical exertion session. The user interface may present data for interacting with the exercise machine in the context of a game (e.g., a video game), such that a user experience for interacting with the exercise machine may be similar to a user experience for playing a video game. Such a user experience may, for example, provide greater motivation to a user to persevere and/or strive to achieve an exercise goal than a non-gamified user interface. For example, a gamified user interface may provide entertainment, amusement, and/or a competitive aspect that may motivate the user, and which may be absent in non-gamified user interfaces. In some embodiments, a mobile communication device paired to an electronic exercise machine may additionally be used to control and/or display one or more settings of the electronic exercise machine.

In some disclosed embodiments the exercise machine includes a frame. A frame refers to any rigid structure for supporting and/or housing machine components such as one or more pullies, one or more weights and/or a resistance motor. A frame may include at least one beam and/or additional beams, bars, and/or rods for providing strength and structural integrity to an exercise machine. A frame may be formed from sturdy metal (e.g., aluminum and/or steel) or any other material to provide structural support and bracing for the exercise equipment and may be designed to withstand the physical forces exerted upon the exercise equipment during performance of physical exertion sessions. Such materials may include steel (e.g., carbon steel and/or stainless steel), aluminum, wood, plastic composites, carbon fiber, titanium, cast iron, fiberglass, plastic, and/or any other material for providing structural support. As a user exerts a force on a cable of an exercise machine, the frame may withstand the force to prevent the exercise machine from wobbling and/or toppling over. In some embodiments, a frame of an exercise machine may be mounted on a wall, a floor and/or ceiling using one or more brackets made of sturdy metal or any other material. In some embodiments, a frame of an exercise machine may be a standalone structure. For instance, such a frame may include one or more supports (e.g., a base and/or one or more bars).

In some disclosed embodiments the exercise machine includes a resistance linkage. Resistance refers to a force exerted to counter or at least partially overcome another force. A resistance linkage refers to any structure, component, or group of components for connecting a resistance mechanism (e.g., one or more weights and/or a resistance motor) with an accessory for exerting a force countering another force exerted by the resistance mechanism (e.g., an interface enabling a human to interact with the exercise machine). A resistance linkage may be flexible, rigid, or may have sections that are flexible (e.g., sections including a chain or cable) and sections that are rigid (e.g., a bar). Some examples of a resistance linkage may include a rope, a cord, a belt, a strap, a series of hinged bars, and/or any other cordage having a tensile strength for withstanding repeated applications of tension.

In some disclosed embodiments, the resistance linkage includes a cable, a band, or a chain. A cable may include any of the alternative structures described elsewhere herein. For example, a cable (as used herein) may include a rope, band, chain, or plurality of fibers or wires (e.g., stainless, and/or galvanized steel) that may be combined and twisted to form an elongated structure and may optionally include a coating such as nylon and/or PVC to reduce friction and wear. In some embodiments, a cable may have a tensile strength suitable for withstanding a resistance force associated with a resistance motor of an electronic exercise machine. The cable may be routed through a pulley system, with a first end of the cable connected to a resistance mechanism and a second end of the cable connected to an accessory for interfacing with a user. The user may engage with the accessory to a mechanical force to be at least partially resisted by the resistance mechanism via the cable and pulley system. A band (e.g., a resistance and/or tension band) may refer to an elongated elastic belt and/or swathe providing a smooth and/or consistent tension along a length thereof. Differing bands may have different thicknesses and/or lengths, each associated with a different tension level and/or for accommodating a different type of exercise. A band may include one or more hooks, eyelets, and/or anchor points for fastening to an exercise machine (e.g., a Pilates machine) and may be used for exercises such as chest presses, rowing, leg extensions, and/or flexibility and/or mobility exercises. A chain refers to a linked structure used for transmitting motion, force, or load. Chains are made up of multiple interconnected links, typically metal, and may be used for transferring a force and providing resistance during a physical exertion session. A chain may include multiple interlinked metal loops (links) of substantially uniform size and shape to ensure smooth motion and even load distribution. A chain may connect to an exercise machine using one or more carabiners, hooks, and/or swivel joints, and may interconnect an accessory with one or more loads (e.g., resistance applicators). For instance, a chain may connect a handle and/or bar to a weight stack and may pass through a pulley system to guide movement.

In some disclosed embodiments, the resistance linkage includes a rigid bar. A rigid bar refers to a stiff and/or unbendable rod and/or staff. A rigid bar may be connected to the cable in an exercise machine to function as a for enabling grasping by a user for transmitting force between the user and a resistance applicator (e.g., a load). A rigid bar may provide direct, linear, and controlled movement while exercising. A rigid bar may connect a handle and/or lever (e.g., an accessory) directly to a resistance applicator, and may pivot around a fixed joint, hinge, and/or linear guide (e.g., instead of a pulley system).

By way of a non-limiting example, FIG. 2 shows exercise machine 220 for pairing with mobile communications device 202 to permit mobile communications device 202 to be used as a gamification display (e.g., display 204) for regulating usage of exercise machine 220. Exercise machine 220 may include a frame 230 and a resistance linkage (e.g., cable 222).

Figure 8:
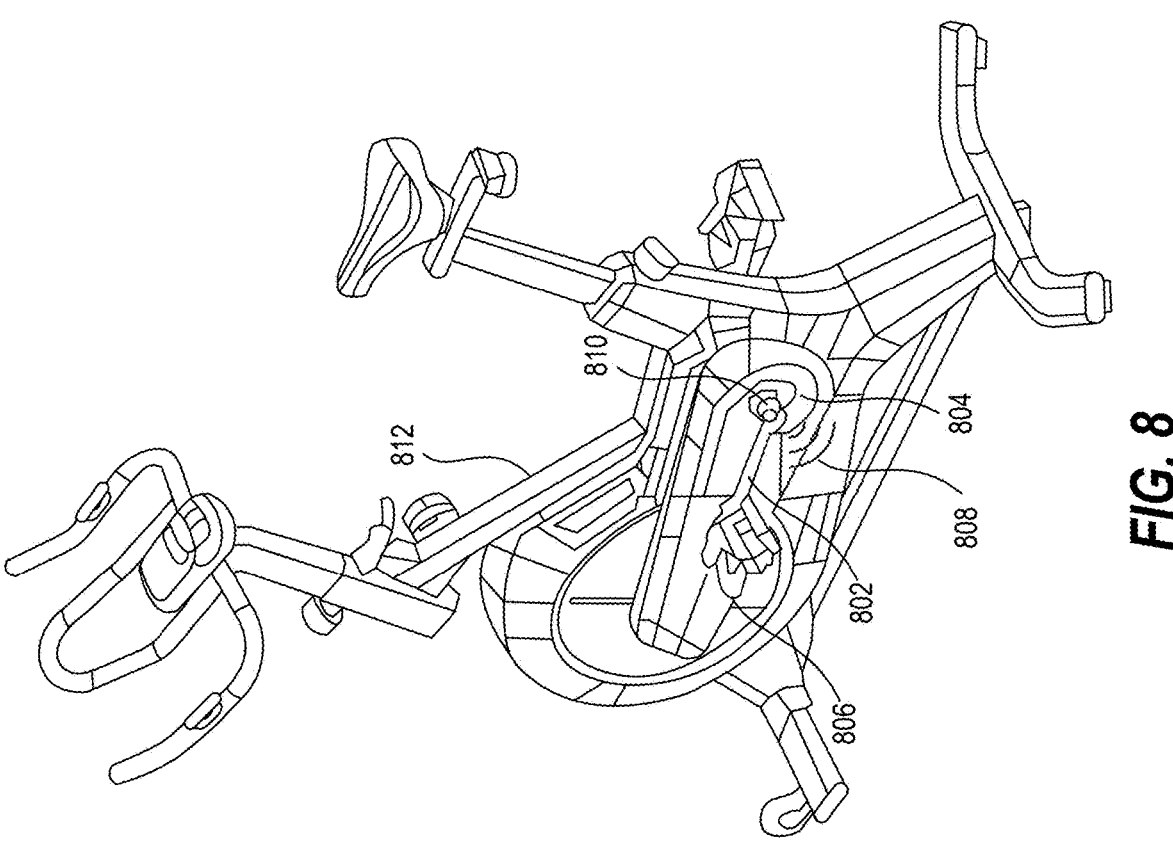
FIG. 8 illustrates an exemplary stationary bicycle, consistent with some disclosed embodiments.

By way of another non-limiting example, reference is made to FIG. 8 illustrating a stationary bicycle 800, consistent with some disclosed embodiments. Stationary bicycle 800 may include a bicycle frame 812 associated with a chain 802 (e.g., a type of resistance linkage). Chain 802 may connect a flywheel 804 to one or more pedals 806.

Figure 9:
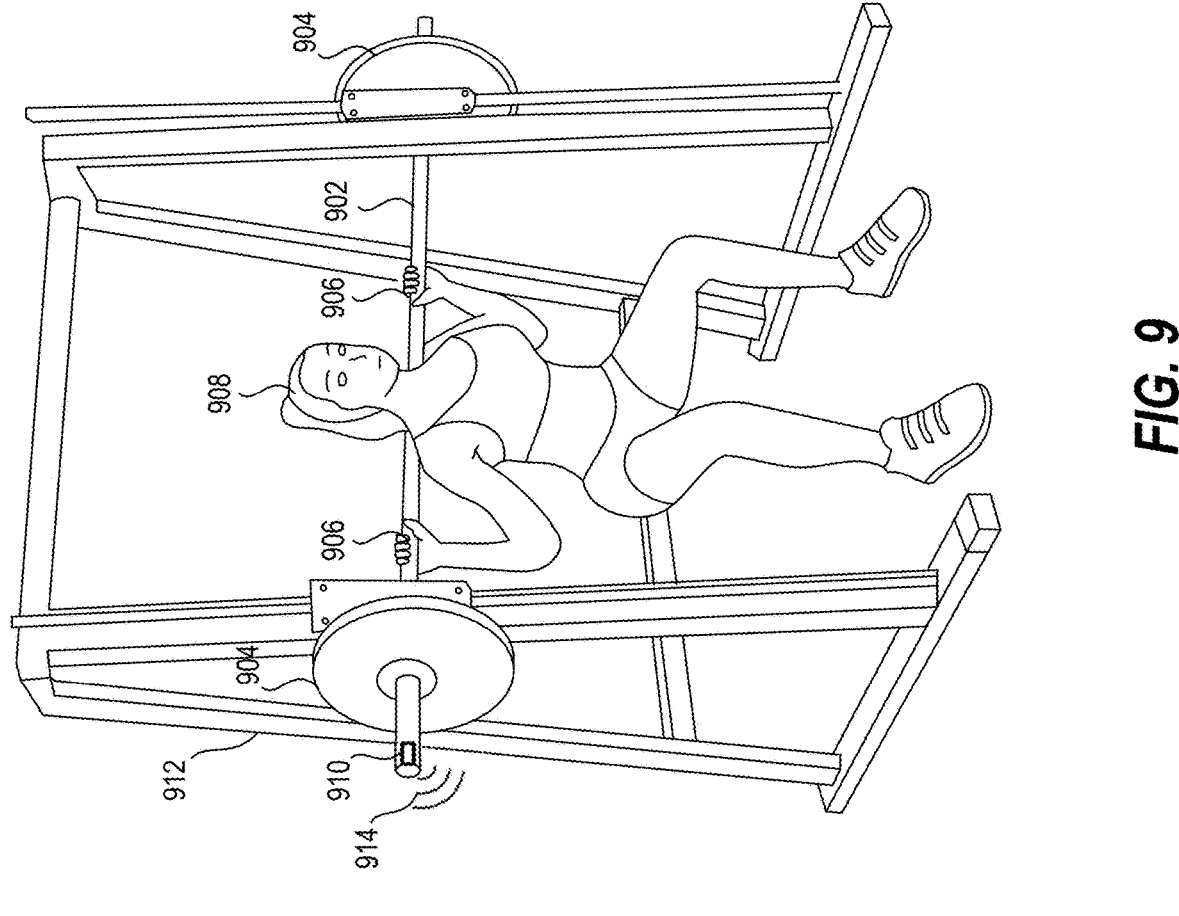
FIG. 9 illustrates an exemplary guided barbell machine, consistent with some disclosed embodiments.

By way of another non-limiting example, reference is made to FIG. 9 illustrating a guided barbell exercise machine 900, consistent with some disclosed embodiments. Guided barbell exercise machine 900 may include a frame 912 for guiding a rigid bar 902 (e.g., a resistance linkage) connecting weights 904. Bar 902 may include grip handles 906 to enable a user 908 to grip rigid bar 902 with the hands.

In some disclosed embodiments the exercise machine includes a resistance applicator. A resistance applicator refers to a mechanism for applying and/or exerting a force, torque, and/or load. The force and/or load applied by a resistance applicator may at least partially resist another force (e.g., exerted by a user). In some disclosed embodiments, the resistance applicator includes a resistive motor, as described elsewhere herein. In some disclosed embodiments, the resistance applicator includes weights (e.g., free weights), as described elsewhere herein. In some disclosed embodiments, the resistance applicator includes at least one of a resistance band, a hydraulic piston, a magnetic resistor, or a fly wheel. A hydraulic piston refers to a mechanical component for converting fluid pressure to linear force or resistance. A hydraulic piston may operate within a hydraulic cylinder, where pressurized fluid (e.g., oil) may push against the piston to provide resistance and smooth motion. For example, a hydraulic piston may connect to handles and/or a seat rail of a rowing machine or may connect to steps of a stepping and/or climbing machine. A hydraulic piston may be included in an elliptical trainer, e.g., to adjust a stride length and/or resistance level, and/or in a weight machine to replace a weight stack. A flywheel refers to a mechanical device that stores rotational energy for maintaining consistent motion and may be used in exercise machines to provide smooth resistance and to regulate momentum. A flywheel may include a heavy wheel connected to a rotatable shaft for storing energy by utilizing the inertia of the heavy wheel. The energy stored by the flywheel may permit maintaining a consistent rotational velocity. A flywheel may be used in an exercise machine to provide steady and/or consistent resistance during an exercise routine. For example, a rowing machine may include a flywheel to ensure smooth rowing motion, a stationary and/or spin bicycle may include a flywheel to maintain rotational momentum, an elliptical trainer may include a flywheel to smooth pedal motion, and a treadmill may include a flywheel to regulate belt speed. A magnetic resistor refers to a device capable of changing electrical resistance (e.g., applied in an exercise machine) when exposed to a magnetic field. For example, one or more magnets may be placed in proximity to a metal flywheel to generate eddy currents slowing the rotation of the flywheel without contact (e.g., frictionless). Moving the magnets closer to/further from the flywheel may increase/decrease the resistance applied to the flywheel. A magnetic resistor may be used to improve precision for controlling the resistance applied by a resistance applicator of an exercise machine. An electric motor is another example of a magnetic resistor.

Some disclosed embodiments involve a resistance applicator mounted to the frame and coupled to the resistance linkage. Mounted refers to installed, affixed, and/or secured. A resistance applicator (e.g., a resistance motor and/or one or more weights) may be secured (e.g., mounted) to a frame using one or more brackets, bolts, rivets, screws, welding, and/or any other type of mechanical connector capable of withstanding stresses. Coupled refers to connected, associated, and/or linked. For example, a resistance motor encased within a housing of an exercise machine may be connected to a spool supporting a cable wound thereon via a belt. As another example, weights of a weight stack may be pierced and threaded with a guiding rod connected to a frame of a weight machine and additionally connected to an end of a cable. As a further example, a flywheel may connect to pedals of an exercise machine via a chain or belt system.

By way of a non-limiting example, in FIG. 2, exercise machine 220 may include a resistance applicator (e.g., weights 218) mounted to frame 230 and coupled to the resistance linkage (e.g., cable 222). In some embodiments, cable 222 may be replaced, at least partially, with a hydraulic piston. In some embodiments, a resistance applicator may include one or more resistance bands 236. In FIG. 5, resistive motor 502 (e.g., a resistive applicator) may be mounted to exercise machine 500. In some embodiments, resistive motor 502 may include a magnetic resistor. In FIG. 8, stationary bicycle may include flywheel 804 (e.g., a resistive applicator) for applying resistance as a user pushes on pedals 806.

In some disclosed embodiments, the resistance applicator is configured to apply resistance to a user-engaging element associated with the resistance linkage. A user engaging element refers to an accessory, appendage, and/or attachment permitting a user to interface and/or interact with a resistance linkage of an exercise machine. A user engaging element may include a knob, a rope, a bar, a lever, a panel, a board, a belt (e.g., of a treadmill), and/or any other component that may be grasped, held, gripped, hooked, pushed, pulled, and/or otherwise in contact with a part of a human body (e.g., a hand, arm, leg, foot, elbow, knee, shoulder, neck, head, and/or any other bodily part). For example, a user may push on a board of a leg press machine using the feet, pull on handles of a bicep curl machine using the hands, or push/press on panels of a thigh machine alternately using the inner thighs and outer legs. In some disclosed embodiments, the user engaging element includes at least one of a handle, a ring, a loop, a T-bar, roped-ball, a pedal, or a paddle. A handle refers to a mechanical component shaped or otherwise configured for grasping by a hand, and which may be made of metal, wood, plastic, or other durable material. For example, a user may pull on a handle to lift a weight. A ring refers to a circular, oval, semi-circular, or semi-oval component for holding securely by a hand, and may be made of metal, plastic, silicone. A ring may be padded, rubber-coated, knurled, and/or may include notches for grip enhancement. A ring may be integrated with a resistance band, a Pilates machine, a gymnastic apparatus, a pull-up bar, and/or bicycle handle. For example, a user may suspend herself on a pair of rings to support her own weight. A loop may refer to a closed or semi-closed component for gripping and/or attaching one or more resistance bands or cables. A handle loop may provide a secure gripping mechanism for pulling or pushing movements using an exercise machine. A strap loop may allow a user to place hands or feet therein for controlled movement (e.g., in a Pilates reformer and/or suspension trainer). A cable loop may be included in a pulley system for guiding a cable of an exercise machine. A foot loop may secure the feet for stability in a cardio machine. A T-bar refers to a horizontal or vertical bar shaped like a "T" that is used as a handle or grip for various strength training exercises. It is commonly found in T-bar row machines, cable machines, and lever-based machines. A T-bar may include two bars arranged perpendicular to each other for providing a secure grip for weight training. A T-bar may be made of metal and may include rubberized and/or knurled grips. For example, a user may grip a T-bar for workouts using back muscles, to use a rowing machine or a cable machine, and/or to lift a barbell, and/or a weightlifting bar. A roped-ball refers to a spherical object attached to a cable or cord. For example, a user may grasp or grip a roped-ball connected to a cable of a weight machine. A pedal refers to a foot-operated level and/or platform for transferring leg motion to a flywheel and/or resistance motor to simulate a cycling motion. For example, a user may push on pedals of a stationary bicycle, a stair stepper or climber, and/or a rowing machine. A paddle refers to a flat or slightly contoured surface for applying a force thereto. A paddle may be included in a rowing machine, a hydraulic resistance machine, a water-based exercise machine, or a thigh machine. A paddle may be made of metal, plastic, rubber, or any combination thereof (e.g., metal covered by a rubber or plastic coating). For example, a user may simulate rowing motion using a paddle of a rowing machine.

Figure 10:
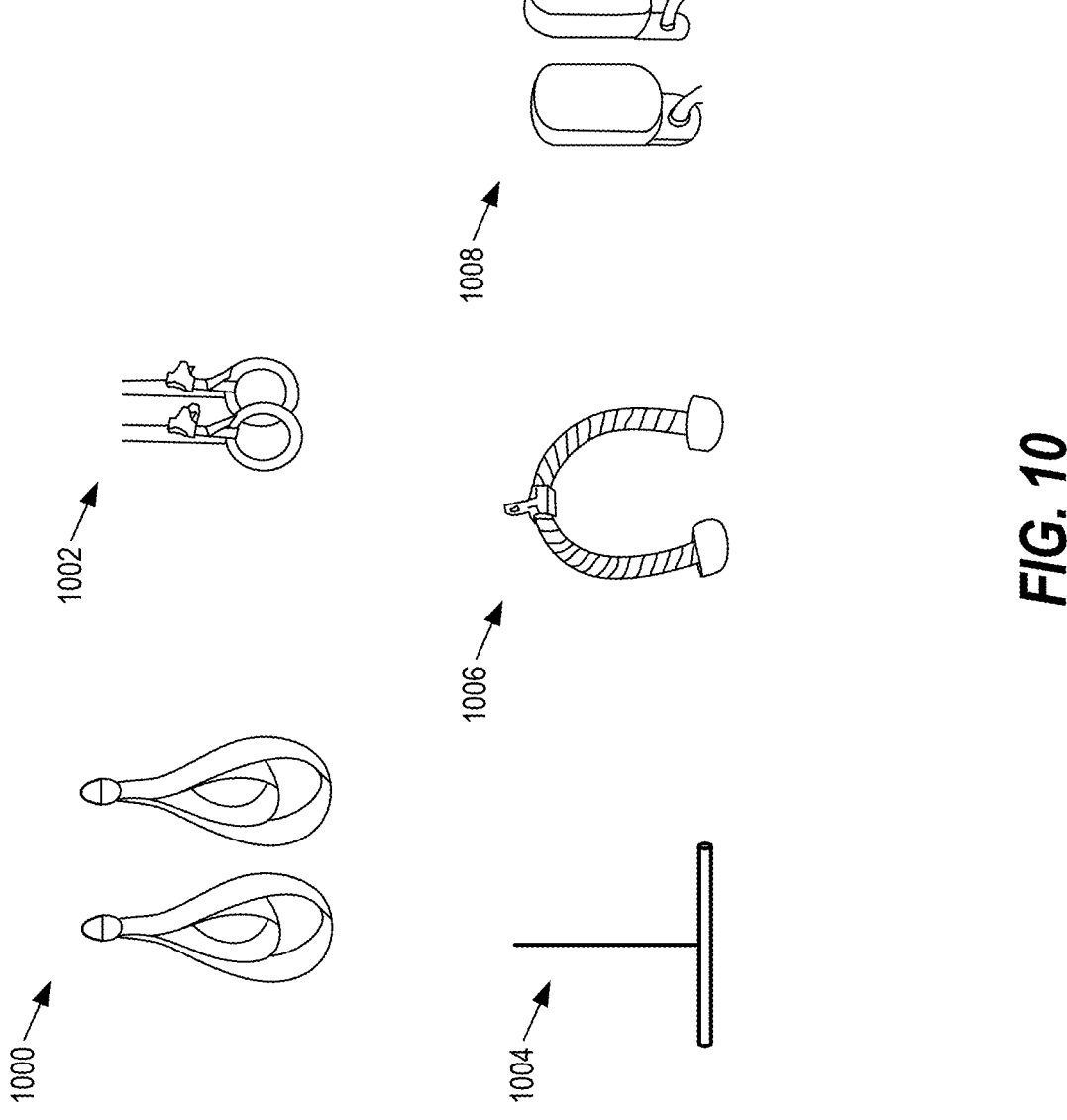
FIG. 10 illustrates a variety of exemplary user engaging elements for an exercise machine, consistent with some disclosed embodiments.

By way of a non-limiting example, in FIG. 2, a user engaging element may include one or more handles 232. In FIG. 8, a user-engaging element may include pedal 806. By way of another non-limiting example, reference is made to FIG. 10 illustrating a variety of exemplary user-engaging elements (e.g., accessories) for an exercise machine (e.g., exercise machine 220 in FIG. 2), consistent with some disclosed embodiments. The user-engaging elements may include one or more rings 1000, loops 1002, a T-bar 1004, a roped-ball 1006, or one or more paddles 1008, and/or any other type of user-engaging element.

Some disclosed embodiments involve at least one sensor for detecting a pace of movement of the resistance linkage. A movement of a resistance linkage may include any motion, such as a sliding, shifting, spinning, and/or rotating of a resistance linkage, e.g., in response to mechanical maneuvers by a user on a user engagement element connected thereto. A pace of movement refers to a rate, a speed, a tempo, and/or a frequency of motions by a resistance linkage. For example, a resistance linkage may repeatedly shift and/or slide forwards, backwards, upwards, downwards, and/or rotate (e.g., clockwise, or counterclockwise). Additionally or alternatively, a resistance linkage may repeatedly alternate between sliding up and down, forwards, and backwards, leftwards, and rightwards, and/or alternately rotate clockwise and counterclockwise), and/or move in any other direction and/or manner in response to manipulations by a user on a user engagement element connected thereto. A sensor for detecting a pace of movement of a resistance linkage refer to a sensor (as described elsewhere herein) associated with a resistance linkage for sensing motion of the resistance linkage over time, e.g., in order to determine a rate and/or frequency of the sensed motion. Such a sensor may be physically connected to or located in proximity to the resistance linkage. In some disclosed embodiments, the at least one sensor includes an image sensor (as described elsewhere herein). For example, an image sensor may be located in proximity to the resistance linkage to permit detection of optical signals reflecting off the resistance linkage, as described elsewhere in this disclosure. The image sensor may convert the optical signals to electrical signals. A transmitter may transmit the electrical signals or radio signals derived therefrom, to at least one processor. In some embodiments, at least one sensor may include multiple sensors, such as multiple image sensors for capturing differing perspectives of a moving resistance linkage, a first image sensor for capture manual exercise movements by a user and a second image sensor for capturing movements of a resistance linkage, a motion sensor combined with an image sensor, and/or any other combination of sensors. The at least one processor may use the received signals to determine a rate of motion of the resistance linkage.

In some disclosed embodiments, the resistance linkage is a cable and the at least one sensor is configured to determine cable movement by detecting rotation of a spool on which the cable is wound. Cable movement refers to motion of a cable (as described earlier) in response to maneuvering by a user (e.g., via a user engaging element). Rotation of a spool on which a cable is wound refers to turning and/or spinning motion of spool on which a cable is wound (as described elsewhere herein). For example, pulling on an end of a cable via a user engaging element may cause the spool to rotate in a first direction to permit the cable to partially unwind from the spool thereby extending the cable (e.g., lengthening the cable by an amount proportional to the unwinding), and releasing the end of the cable may cause the spool to rotate in a second direction, opposite the first direction, to permit the cable to partially wind back onto the spool thereby retracting the cable (e.g., shortening the cable by an amount proportional to the winding). Repeatedly pulling and releasing the end of the cable may thus case the spool to repeatedly rotate in the first direction and rotate in the second direction. At least one sensor may measure one or more of the velocity and/or length of cable being wound and unwound from the spool, a rotational velocity of the spool and/or angle swept as the spool alternately turns in the first direction and in the second direction, a timing, a duration, and/or frequency for each winding/unwinding motion and/or rotational motion, and/or any pauses and/or rest periods in between subsequent winding/unwinding and/or rotational motions, as described elsewhere herein. In some embodiments, the signals indicative of the pace of movement are reflective of movement of the cable. Movement of the cable refers to motion of the cable as the cable alternately winds and unwinds from the spool. The pace of movement by the user maneuvering the cable may directly correspond to the motion of the cable. Thus, a measure of a pace of cable movement may be used to determine a pace of the user's movement. In some disclosed embodiments, the sensor is an integral part of a resistance motor connected to the spool, as described elsewhere herein.

By way of a non-limiting example, in FIG. 2, exercise machine 220 may include at least one sensor 228 and/or image sensor 226 for detecting a pace of movement of the resistance linkage (e.g., cable 222). In FIG. 5, the resistance linkage is cable 506, and at least one sensor 508 may determine cable movement by detecting rotation of spool 504 on which cable 506 is wound. In FIG. 8, sensor 810 may detect movement of chain 802 and/or rotational motion of flywheel 804. In FIG. 9, sensor 910 may detect movement of bar 902.

Some disclosed embodiments involve a transmitter configured for pairing with a mobile communications device having a display and running software for causing a graphical element to move on the display. A transmitter for pairing with a mobile communications device may be understood as described elsewhere herein. A mobile communications device having a display refers to a mobile communications device (as described elsewhere herein) having a screen for visually presenting data to a user. A mobile communications device running software refers to at least one processor included in the mobile communications device for executing one or more program code instructions stored in an associated memory. For instance, a software application for gamifying a physical exertion session may be stored in a memory accessible by at least one processor of the mobile communications device. The memory may be a local memory configured with the mobile communications device and/or a remote memory accessible via a communications network (e.g., a cloud server). Causing a graphical element to move on a display refers to activating different pixels of an electronic screen over time to simulate motion of an object across and/or within a portion of the electronic screen. For example, at least one processor may cause a graphical element to translate (e.g., slide, shift, drop, rise, bounce), rotate (e.g., spin in place and/or across a screen), vibrate, and/or pulse. In some embodiments, a graphical element may be rescaled, skewed, and/or undergo a change in opacity to simulate motion (e.g., by shrinking and/or fading to simulate movement away from the user, enlarging and/or brightening to simulate movement towards the user, and skewing to simulate sideways motion). In some embodiments, a background of a graphical element may be changed to simulate motion thereof (e.g., the display of a first graphical element may remain stationary as one or more second (e.g., background) graphical elements appear to move).

By way of a non-limiting example, in FIG. 2, exercise machine 220 includes transmitter 208 for pairing with mobile communications device 202 (e.g., via network 210). Mobile communications device 202 may have display 204 and may run software (e.g., stored in memory 104 in FIG. 1) causing controllable element 304 (FIG. 3) (e.g., a graphical element) to move on display 204. Similarly, exercise machine 500 may include a transmitter 510 (FIG. 5), stationary bicycle 800 may include transmitter 808, and guided barbell exercise machine 900 may include a transmitter 914 (FIG. 9). Any of transmitters 510, 808, and/or 914 may correspond to transceiver 106 in FIG. 1. Any of transmitters 510, 808, and/or 914 may pair with mobile communications device 202.

By way of another non-limiting example, in FIG. 8, stationary bicycle 800 may include a transmitter 808 associated with a sensor 810. Sensor 810 may sense a pace of movement of chain 802 while a user pushes on pedals 806, causing flywheel 804 to spin. Transmitter 808 may pair to mobile communications device 202 and transmit signals indicative of the sensed pace of movement.

By way of a further non-limiting example, in FIG. 9, Bar 902 may be associated with a sensor 910 for sensing motion as user 908 lifts and lowers bar 902. Sensor 910 may be coupled to transmitter 914 for pairing with mobile communications device 202. Transmitter 914 may transmit signals indicative of the sensed motion to mobile communications device 202

Some disclosed embodiments involve at least one processor configured to receive pace indications from the at least one sensor and to output pacing signals for transmission by the transmitter. Receiving may be understood as defined elsewhere herein. Pace indications from a sensor refers to data outputted by a sensor signifying and/or representing a speed, rate, step, stride, distance measurement, velocity, range, and/or frequency of motion. For example, pace indications may include optical signals (e.g., from an optical sensor) indicating a rate of translatory motion of a bar connected to a weight stack via a chain, electrical signals (e.g., from a gyroscope) indicating a rate of rotation of a spool around which a chain is wound, electrical signals (e.g., from an active ultrasonic and/or passive infrared, or PIR sensor) indicating a rate of translatory motion of a chain and/or cable connected to a resistance motor and/or weight stack, and/or electrical signals (e.g., from a shaft encoder or rotary pulse generator, proximity sensor, and/or photoelectric sensor) indicating rotations per minute (RPM) of a resistance motor. To output for transmission may include to send, convey, and/or transmit via a wired and/or wireless communications link. For example, an antenna may send a radio signal, an electrical transmitter may send an electrical signal, and a laser may produce an optical signal. The radio signal, electrical signal, and/or optical signal may include data encoded therein. Pacing signals may include data indicative of a speed, rate, step, stride, distance measurement, velocity, range, and/or frequency of motion. For example, at least one processor may be included with and/or otherwise associated with an exercise machine. The at least one processor may be distinct from at least one processor included in a mobile communications device connected thereto. The at least one processor associated with the exercise machine may use pace indications received from a sensor to compute data for regulating, guiding, and/or informing a user how to maneuver a user-engaging element of the exercise machine, e.g., in order to achieve a fitness goal. Such data may, for example, mimic the user's physical manipulations of the user-engaging element, and may be scaled to correspond to a size of a visual display. Upon computing the pacing signals from the pace indications, the at least one processor may encode the pacing signals for transmission and provide the encoded pacing signals to a transmitter (e.g., an antenna and/or cable) for conveying to a mobile communications device paired thereto.

Some disclosed embodiments involve pacing signals configured, upon receipt by the mobile communications device, to cause the graphical element to move at a second pace corresponding to the first pace of movement of the resistance linkage. Upon receipt by a mobile communications device refers to upon acceptance by and/or delivery to the mobile communications device, e.g., and stored in a local and/or remote memory accessible by a processor of the mobile communications device. A second pace corresponding to the first pace of movement of the resistance linkage refers to a speed, rate, step, stride, distance measurement, velocity, range, and/or frequency of motion of graphical element to mimic or otherwise represent the corresponding speed, rate, step, stride, distance measurement, velocity, range, and/or frequency of motion of the resistance linkage. For instance, if a user's exercise motion causes a cable to move at one meter per second, at least one processor may scale the one meter per second motion as five millimeters per second for display a corresponding motion on an electronic screen of a mobile communications device, representing the one meter per second physical motion. If the user increases the cable speed to 1.5 meters per second or decelerate the cable speed to 0.5 meters per second, the at least one processor may scale the movement of the graphical element on the visual display to 2.5 millimeters per second, and 7.5 millimeters per second, respectively, to cause the motion of the graphical element on the visual display to mimic the physical motion of the user. Similarly, if the user causes the cable to pause and/or change the direction of motion, the at least one processor may cause the graphical element displayed on the visual display to stop for the duration of the pause and/or move in an opposite direction. The at least one processor may user one or more of a screen size, screen resolution, user setting and/or any other information required to transform physical motion by a resistance linkage to a corresponding virtual motion by a graphical user element displayed via a mobile communications device.

In some disclosed embodiments, the graphical element is a paddle, and the at least one processor is configured to generate the pacing signals in a form for causing the paddle to move on the display in a manner correlated to movement of the resistance linkage. Causing a paddle to move on a display refers to activating and/or deactivating pixels of an electronic screen to cause virtual motion of a paddle (as described elsewhere herein) on the electronic screen. Correlated refers to related, associated, and/or coordinated. Two correlated objects may move in a synchronous and/or proportional matter. For example, at least one processor associated with an exercise machine may transmit (via a transmitter) signals indicative of cable speed of one meter per second. At least one processor associated with a first mobile communications device (e.g., a mobile phone) may use the received signals to determine a first speed of five millimeters per second for virtually moving a virtual paddle across the screen of the mobile phone, to represent the one meter per second movement of the cable. However, at least one processor associated with a second mobile communications device (e.g., a tablet having a larger screen than a mobile phone) may use the received signals to determine a second corresponding speed of 1 centimeter per second for virtually moving a virtual paddle across the screen of the tablet to represent the one meter per second movement of the cable. If the signals received from the processor of the exercise machine indicate an increase or decrease in cable speed, the at least one processor of the mobile phone and the at least one processor of the tablet may increase or decrease the speed of the virtual paddle in a manner scaled to the screen size of the mobile phone and the tablet, accordingly. If the signals received from the processor of the exercise machine indicate a halt in cable motion and/or a change of direction in cable motion, the at least one processor of the mobile phone and the at least one processor of the tablet may cause the virtual paddle to stop moving for the duration of the halting and/or move in a direction opposite to the current direction of motion.

Some disclosed embodiments involve enabling regulation of the pace of movement of the resistance linkage via observation of the graphical element on the display of the mobile communications device paired with the transmitter. Enabling regulation refers to facilitating and/or permitting control, adjustment, modification, and/or synchronization. By presenting feedback of a user's manual exercise movements, at least one processor may enable the user to regulate the pace of movement of a resistance linkage corresponding to the manual exercise movements. The pace of movement of a resistance linkage refers to a speed, rate, step, stride, distance measurement, velocity, range, and/or frequency of motion, e.g., due to manual exercise movements on a user-engagement element connected thereto. Observation of a graphical element on a display refers to visually tracking, monitoring, watching, and/or viewing a graphical element visually presented on an electronic screen. At least one processor of a mobile communications device may display a graphical element on an electronic screen to provide visual feedback to a user performing manual exercise movements using a user-engaging element of an exercise machine. The feedback may be provided continually throughout performance of the manual exercise movements, e.g., as a sensor continually senses resistance linkage movement due to manual exercise movements, an associated transmitter and processor of the exercise machine may continually transmit pacing signals to the mobile communications device. For example, a processor of the mobile communications device may use the pacing signals to continually update the virtual motion of the graphical element to correspond to the physical movement of the resistance linkage. The user may visually track the virtual motion of a graphical element and use the virtual motion as guidance for adjusting the manual exercise movements. For instance, the virtual motion of the graphical element may indicate that a current speed of manual exercise movements is too fast or too slow (e.g., by causing a loss or lack of accrual of points, and/or by displaying an animation with a negative connotation in the context of a game). The user may use the indication to modify (e.g., by increasing or decreasing) the speed of the manual exercise movements and thereby cause a corresponding modification in the virtual motion of the graphical element. At least one processor may visually indicate when the user has modified the speed of the manual exercise movements to a desired speed by rewarding the user with visual feedback (e.g., by increasing the number of points accrued, and/or by displaying an animation with positive connotations).

By way of a non-limiting example, in FIG. 2, exercise machine 220 may include at least one processor 234. Processor 234 may receive pace indications from sensor 228 and may output pacing signals for transmission by transmitter 208. Upon receipt by mobile communications device 202, the pacing signals may cause controllable element 304 (FIG. 3) (e.g., a controllable graphical element) to move at a pace corresponding to the pace of movement of the resistance linkage (e.g., cable 222). This may enable regulation of the pace of movement of the resistance linkage (e.g., cable 222) via observation of controllable element 304 (FIG. 3) on display 204 of mobile communications device 202 paired with transmitter 208.

By way of another non-limiting example, in FIG. 3, controllable element 304 may be a paddle. At least one processor (e.g., processor 102 associated with mobile communications device 202 and/or processor 234) may generate the pacing signals in a form for causing controllable element 304 (e.g., shaped like a paddle) to move on display 204 in a manner correlated to movement of the resistance linkage (e.g., cable 222).

In some disclosed embodiments, the software is configured to cause pacing elements to move on the display, and wherein the at least one processor is configured to generate the pacing signals in a form for causing the graphical element to collide with the pacing elements when a pace of the resistance linkage corresponds to a predetermined exercise pace. Causing pacing elements to move on a display refers to activating and/or deactivating pixels of a display to cause virtual motion of pacing elements (as described elsewhere herein). At least one processor may cause pacing elements to move virtually along one or more axes (e.g., translatory movement), spin, increase in size, decrease in size, fade, brighten, and/or undergo any other type of virtual animation indicative of motion. To generate pacing signals may include to produce, compute, and/or calculate pacing signals, e.g., from pace indications received from a sensor. Some disclosed embodiments further involve causing pacing elements to move on the display of the mobile communications device. For example, at least one processor associated with a mobile communications device may receive pacing signals from at least one processor associated with a sensor monitoring an exercise machine or a user of the exercise machine. The at least one processor associated with the mobile communications device may determine a size, speed, and/or locations for displaying pacing elements based on the pacing signals such that the pacing elements track the motion of the resistance linkage. Causing a graphical element to collide with a pacing element refers to causing a display of a graphical element to at least partially overlap and/or be located within a threshold distance of a display of a pacing element, as described elsewhere herein (e.g., a collision between a controllable element and a pacing element). For example, at least one processor may use the same pixels to display at least a portion of a graphical element and at least a portion of a pacing element. A pace of a resistance linkage corresponds to a predetermined exercise pace refers to a rate of the resistance linkage (e.g., caused by manual exercise movements) agreeing and/or conforming to a desired and/or recommended exercise pace (e.g., 1 meter per second). For example, a first processor of an exercise machine may use pacing indications received from a sensor to determine a corresponding cable speed and transmit signals indicative of the cable speed to a second processor of a mobile device paired thereto. The second processor may use the cable speed indications to determine a virtual speed for moving a graphical element on a display of the mobile device. The virtual speed of the graphical element may track the cable speed, thereby providing visual feedback of the cable speed. Concurrently with moving the graphical element, the second processor of the mobile device may cause pacing elements to move virtually on the display of the mobile device. The virtual speed of the pacing elements may be based on a desired and/or recommended speed, such that when the user performs manual exercise movements to cause the cable speed to match the desired and/or recommended speed, the graphical element, tracking the cable speed, collides with one or more of the pacing elements. At least one processor may receive a predetermined exercise pace via a user interface, e.g., of a mobile device, a cloud service, a setting of an exercise machine, a history, in association with another user (e.g., from a competitor as a challenge in an interactive game) and/or any other source of information.

By way of another non-limiting example, in FIG. 3, the software may cause pacing elements 308, 310, and 312 to move on display 204 (FIG. 2). At least one processor (e.g., processor 102 in FIG. 1) may generate the pacing signals in a form for causing controllable element 304 to collide with pacing elements 308, 310, and 312 when a pace of cable 222 corresponds to a predetermined exercise pace.

A mode signal refers to an indication for a setting, manner, and/or type, e.g., of activity. For example, the mode signal may be indicative of a particular exercise. Such modes may include, one or more of chest presses, flys, lat pulldowns, and rows to strengthen the chest, back, and shoulders; Bicep curls and triceps for arm development; lateral raises and face pulls for shoulder stability and definition; cable squats, lunges, glute kickbacks, and hip abductions, which engage the legs and glutes; cable woodchoppers, standing oblique twists, and resisted crunches for the abdominal muscles for improving rotational stability; cable deadlifts and cable-assisted step-ups for multiple muscle groups. Modes may additionally or alternatively relate to resistance levels, movement patterns, and/or motor operation. At least one processor associated with an exercise machine and/or a mobile communications device connected thereto may output a mode signal in response to input received from a user and/or based on a usage history of the user. A user may input a mode selection via an electronic interface provided by the mobile communications device and/or exercise machine. Additionally or alternatively, a user may mechanically and/or electronically adjust a setting of an exercise machine, and an associated processor may detect the adjustment and output a mode signal corresponding to the adjustment.

In some disclosed embodiments, the at least one processor is configured to output a mode signal, and wherein the mode signal is configured to control the pacing elements. For instance, a mode signal may alter one or more properties of the pacing elements. A mode may determine a number of repetitions per set, a number of sets per exertion session, a timeframe for completing each set and/or exertion session, introduction of one or more pauses during an exertion session, a resistance setting, an increase and/or decrease in resistance during an exertion session, a rate at which pacing elements move on the display, and/or any other parameter for structuring a physical exertion session. Such parameters may affect a number of pacing elements displayed during a particular repetition, set, and/or exertion session, a velocity and/or acceleration for each pacing element, a size and/or color for a pacing element. By way of example, a gamified physical exertion session may be performed according to a beginner (e.g., easy), intermediate (e.g., medium), advanced (e.g., challenging) mode or manner. Each mode may correspond to a different predetermined exercise pace. For instance, a beginner mode may be associated with a slower pace than an intermediate mode, which may be associated with a slower pace than an advanced mode. At least one processor may output a signal for calibrating the speed of the pacing elements to correspond to each mode, such that in the beginner mode, the pacing elements may move slower than in the intermediate mode, and in the intermediate mode, the pacing elements move slower than in the advanced mode. Consequently, in the beginner mode, collisions between the graphical element and the pacing elements may occur when the graphical element (tracking the motion of the resistance linkage) moves slower than in the intermediate mode, and in the intermediate mode, collisions between the graphical element and the pacing elements may occur when the graphical element moves slower than in the advanced mode. In a similar manner, at least one processor may output a signal to continue displaying pacing elements for a specific time period (e.g., a shorter time period for an easier mode and a longer time period for a more difficult mode), pauses between exercise repetitions (e.g., longer and/or more frequent pauses for an easier mode versus shorter and/or less frequent pauses for a more challenging mode), accelerate and/or decelerate the speed of the pacing elements, and/or perform any other modifications to the speed of the pacing elements based on a mode setting.

In some disclosed embodiments, the at least one processor is configured to output a mode signal, and the mode signal is configured to alter a mode of the software. A mode of the software may refer to setting and/or manner for software to interact with a user and/or with an additional user. For instance, a software mode may include an interactive mode (e.g., to compete with another user), a public mode (e.g., for competing with multiple additional users), and/or solo mode. Additional software modes may include a cumulative mode (e.g., where scoring of collisions may be accumulated from previous exercise session). Additional software modes may correspond to differing gamified versions of a gamified exercise routine. For instance, one mode may gamify an exercise routine to mimic a shooting gallery whereby a moving target collides with pacing elements displayed as bullets, and another mode may gamify an exercise routine to mimic catching falling objects (e.g., a moving basket catches falling fruit). At least one processor may receive a user selection of a software mode for a gamified exercise routine and transmit a mode signal to cause the selected mode to be implemented in a gamified physical exertion session. Other examples of a mode signal altering a mode of software include experience level mode signals that make a routine more or less difficult or an exercise type mode signal, that alters the display parameters based on a type of exercise or group of muscles worked (e.g., lower body workout, core workout, upper body workout).

By way of another non-limiting example, at least one processor (e.g., processor 102 in FIG. 1) associated with an exercise machine (e.g., any of exercise equipment 212, electronic exercise machine 500, stationary bicycle 800, and/or guided barbell exercise machine 900) may output a mode signal for controlling pacing elements 308, 310, and 312. The mode signal may be applied by a software application executed by the at least one processor to control display properties of pacing elements 308, 310, and/or 312. Such display properties may include, for example, how many pacing elements are displayed, the velocity and/or acceleration of the pacing elements, pauses between displays of consecutive pacing elements, a time duration for displaying the pacing elements (e.g., corresponding to a length of an exertion session), and/or any other display property for the pacing elements. For example, when an easier mode is selected (e.g., as a user input via display 204), the mode signal may cause pacing elements 308, 310, and 312 to move slower than when a more difficult mode is selected. Similarly, selection of an easier mode may introduce longer pauses between the display of consecutive pacing elements. In some embodiments, at least one processor may output a mode signal for altering a mode of the software. For example, the mode of the software may alternate between a single user mode and a mode for interacting with additional users (e.g., via network 210).

Figure 12:
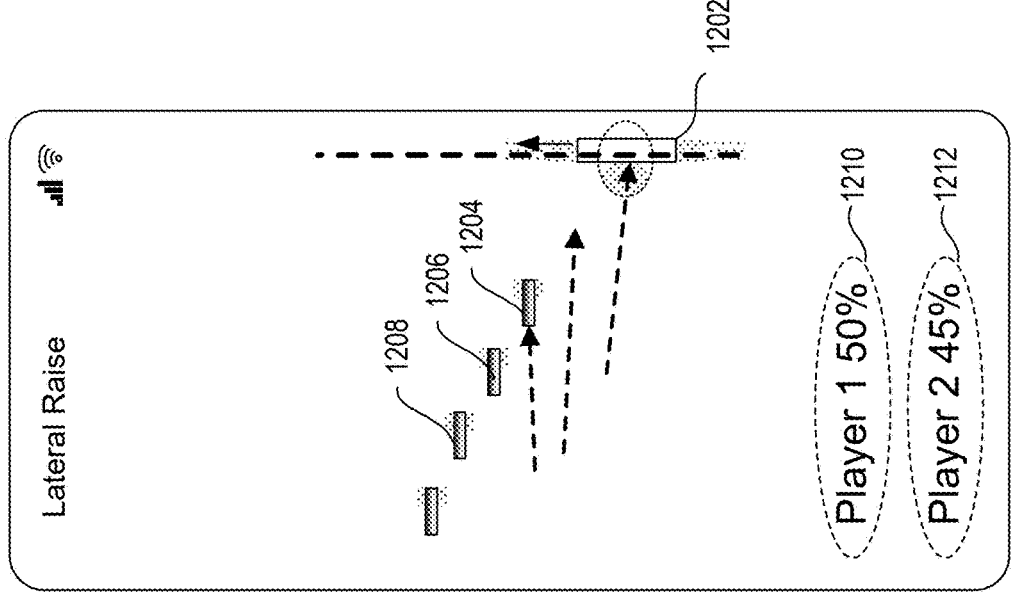
FIG. 12 illustrates an exemplary user interface for gamifying a physical exertion session in an altered mode, consistent with some disclosed embodiments.

By way of another non-limiting example, reference is made to FIG. 12 illustrating an exemplary user interface 1200 for gamifying a physical exertion session in an altered mode, consistent with some disclosed embodiments. User interface 1200 is substantially similar to user interface 300 of FIG. 3 with the noted difference that a graphical element 1201 may move along a vertically aligned axis relative to display 204 of mobile communications device 202 and/or display 512 of exercise machine 500, and pacing elements 1204, 1206, and 1208 may move along horizontally aligned axes, e.g., to mimic a shooting gallery where graphical element 1202 may represent a moving target. In addition, two tallied scores may be displayed, a first score 1210 for a user associated with the gamified exertion session displayed via user interface 1200 and a second (e.g., remote) user associated with a different gamified exertion session.

In some disclosed embodiments, the signals are further indicative of a direction of linkage movement, and wherein the at least one processor is configured to cause a graphical element to change direction on the display when the linkage movement changes direction. A direction of linkage movement may refer to a phase within an exercise repetition. For example, when a user repeatedly pulls and releases a cable connected to a resistance motor, the direction of the cable may alternately extend (e.g., unwind from a spool) and retract (e.g., rewind on the spool). Similarly, when a user repeatedly lifts and lowers a weight, a bar may alternately move upwards and downwards. To cause a graphical element to change a direction on a display refers to activating and/or deactivating pixels to virtually display the graphical element to switch course and/or move in an opposite trajectory (e.g., rotated by 180°). For instance, when a user pushes a weight away from the body, at least one processor may execute software instructions to cause a graphical element to move from left to right, and when the user releases the weight such that the weight moves toward the body, at least one processor may cause the graphical element to move from right to left, or the reverse. Similarly, as a user lifts a weight, at least one processor may execute software instructions to cause a graphical element to move in an upwards direction, and as the user lowers the weight, at least one processor may cause a graphical element to move in a downwards direction. By displaying pacing elements in opposing directions, at least one processor may pace a user during each phase of an exercise repetition (e.g., during the push and pull and/or lift and lower phases).

By way of a non-limiting example, in FIGS. 3-4, signals received by mobile communications device 202 from transmitter 208 may indicate a direction of linkage movement. When user 214 pulls on bar 216 to lift weights 218, at least one processor may cause controllable element 304 to move from left to right, as shown in FIG. 3. When user 214 releases bar 216 to lower weights 218 (e.g., when the linkage movement changes direction), at least one processor may cause controllable element 304 to change direction on display 204 and move from right to left, as shown in FIG. 4. In FIG. 12, at least one processor may cause graphical element 1202 to move upwards in response to a first direction of linkage movement, and downwards in response to a change in direction of linkage movement.

FIG. 11 is a flowchart of example process 1100 for gamifying a physical exertion session, consistent with embodiments of the present disclosure. In some embodiments, process 1100 may be performed by at least one processor (e.g., processor 102 in FIG. 1 of mobile communications device 202 and/or processor 234 of exercise machine 220) to perform operations or functions described herein. In some embodiments, some aspects of process 1100 may be implemented as software (e.g., program codes or instructions) that are stored in a memory (e.g., memory 104) or a non-transitory computer readable medium. In some embodiments, some aspects of process 1100 may be implemented as hardware (e.g., a specific-purpose circuit). In some embodiments, process 1100 may be implemented as a combination of software and hardware.

Referring to FIG. 11, process 1100 may include a step 1102 of pairing a mobile communications device with a communications module associated with an exercise machine, wherein the pairing includes establishing a communications channel between the mobile communications device and the exercise machine. A communications module may include one or more antennas, electronic receivers, and/or transmitters (e.g., transceivers), optical emitters and/or photodetectors, and/or any other type of receiver and/or transmitter for sending and receiving signals. Pairing a mobile communications device with a communications module may include pairing (as described elsewhere herein) a transceiver of a mobile communications device with a transceiver associated with an exercise machine. By way of a non-limiting example, in FIG. 2, at least one processor (e.g., processor 102 of FIG. 1 of mobile communications device 202) may pair with a communications module (e.g., processor 234 and transmitter 208) of exercise machine 220. The pairing may include establishing a communications channel between mobile communications device 202 and exercise machine 220, e.g., via network 210. The pairing may be initiated by a processor 102 or processor 234.

Process may include a step 1104 of receiving, via the communications channel from a sensor associated with the exercise machine, signals indicative of a pace of movement of a resistance linkage of the exercise machine. By way of a non-limiting example, in FIGS. 2-3, at least one processor (e.g., processor 102 of FIG. 1 of mobile communications device 202) may receive, via the communications channel (e.g., network 210), from sensor 228 associated with exercise machine 220, signals indicative of a pace of movement of cable 222 of exercise machine 220.

Process may include a step 1106 of causing a graphical element to move on a display of the mobile communications device, the movement of the graphical element corresponding to movement of the resistance linkage of the exercise machine thereby enabling regulation of the pace of movement of the resistance linkage via observation of the graphical element on the display of the mobile communications device. By way of a non-limiting example, in FIGS. 2-3, at least one processor (e.g., processor 102 of FIG. 1 of mobile communications device 202) may cause controllable element 304 (e.g., a graphical element) to move on display 204 of mobile communications device 202. The movement of controllable element 304 may correspond to movement of cable 222 of exercise machine 220, thereby enabling regulation of the pace of movement of cable 222 via observation of controllable element 304 on display 204 of mobile communications device 202.

Various example embodiments for gamified exertion session technologies are articulated below in the form of clauses. It is to be understood the term "technology" refers equally to systems (e.g., exercise machines, computing devices (e.g., processors, non-transitory computer readable media), resistance motors, and methods for operating these systems.

Clause 1. A non-transitory computer readable medium containing instructions that when executed by at least one processor causes the at least one processor to perform operations for gamifying a physical exertion session, the operations comprising: receiving signals indicative of exercise equipment movement repetitions, the signals corresponding to at least one property of manual exercise movements; presenting via a display, a controllable element, the controllable element being movable along a first axis; presenting via the display, a plurality of pacing elements movable along a plurality of second axes transverse to the first axis, wherein movement of the pacing elements corresponds to a desired pace of the exercise equipment movement repetitions; regulating movement of the controllable element along the first axis in a manner corresponding to speeds of the manual exercise movements; determining collisions between the controllable element movable along the first axis and the plurality of pacing elements movable along the plurality of transverse second axes; and upon determination of a collision, causing a collision indication to appear on the display.
  Clause 2. The technology of clause 1, wherein the control element is a horizontally movable object, and the pacing elements are simulations of vertical falling objects.

Clause 3. The technology of each preceding clause alone or in combination, wherein the horizontally movable object is a paddle.
  Clause 4. The technology of each preceding clause alone or in combination, wherein the collision indication occurs at a transverse intersection of the controllable element and a colliding pacing element.
  Clause 5. The technology of each preceding clause alone or in combination, wherein the exercise equipment includes a transmitter for transmitting the signals, and wherein the display is associated with a mobile computing device paired with the transmitter of the exercise equipment.
  Clause 6. The technology of each preceding clause alone or in combination, wherein the exercise equipment includes free weights and wherein the signals correspond to an output of an image sensor arranged to detect movement of the free weights.
  Clause 7. The technology of each preceding clause alone or in combination, wherein the exercise equipment includes a weight machine having a sensor for outputting the signals.
  Clause 8. The technology of each preceding clause alone or in combination, wherein the signals are derived from an image sensor.
  Clause 9. The technology of each preceding clause alone or in combination, wherein the weight machine includes a cable, wherein the manual exercise movements correspond to movement of the cable, wherein the sensor is configured to detect the movement of the cable, and wherein the signals are indicative of the cable movement.
  Clause 10. The technology of each preceding clause alone or in combination, wherein the sensor is configured to detect movement by sensing rotation of a spool on which the cable is wound.
  Clause 11. The technology of each preceding clause alone or in combination, wherein the sensor is an integral part of a resistance motor connected to the spool.
  Clause 12. The technology of each preceding clause alone or in combination, wherein a first subset of the plurality of pacing elements, including at least two of the plurality of pacing elements, move along a common one of the plurality of second axes.
  Clause 13. The technology of each preceding clause alone or in combination, wherein each of a second subset of the plurality of pacing elements move along a differing one of the second axes.
  Clause 14. The technology of each preceding clause alone or in combination, wherein the operations further include tallying a score based on a number of determined collisions.
  Clause 15. The technology of each preceding clause alone or in combination, wherein the tallied score includes a numerical indication of a number of determined collisions.
  Clause 16. A system for gamifying a physical exertion session, the system comprising at least one processor configured to: receive signals indicative of exercise equipment movement repetitions, the signals corresponding to speeds of manual exercise movements; present via a display, a controllable element, the controllable element being movable along a first axis; present via the display, a plurality of pacing elements movable along a plurality of second axes transverse to the first axis, wherein movement of the plurality of pacing elements corresponds to a desired pace of the exercise equipment movement repetitions; regulate movement of the controllable element along the first axis in a manner corresponding to the speeds of manual exercise movements; determine collisions between the controllable element movable along the first axis and the plurality of pacing elements movable along the plurality of transverse second axes; and upon determination of a collision, cause a collision indication to appear on the display.

Clause 17. The technology of each preceding clause alone or in combination, wherein the control element is a horizontally movable object, and the pacing elements are simulations of vertically falling objects.

Clause 18. The technology of each preceding clause alone or in combination, wherein the exercise equipment includes a transmitter for transmitting the signals, and wherein the display is associated with a mobile computing device paired with the transmitter of the exercise equipment.

Clause 19. The technology of each preceding clause alone or in combination, wherein a first subset of the plurality of pacing elements including at least two of the plurality of pacing elements moving along a common one of the plurality of second axes.

Clause 20. The technology of each preceding clause alone or in combination, wherein the at least one property of manual exercise movements includes at least one of a velocity associated with cable movement, an acceleration with cable movement, a cable displacement, or a cable position.

Clause 21. An exercise machine configured for pairing with a mobile communications device in order to permit the mobile communications device to be used as a gamification display for regulating usage of the exercise machine, the exercise machine comprising: a frame; a resistance linkage; a resistance applicator mounted to the frame and coupled to the resistance linkage, wherein the resistance applicator is configured to apply resistance to a user-engaging element associated with the resistance linkage; at least one sensor for detecting a first pace of movement of the resistance linkage; a transmitter configured for pairing with the mobile communications device having a display and running software for causing a graphical element to move on the display; and at least one processor configured to receive pace indications from the at least one sensor and to output pacing signals for transmission by the transmitter, wherein the pacing signals are configured, upon receipt by the mobile communications device, to cause the graphical element to move at a second pace corresponding to the first pace of movement of the resistance linkage thereby enabling regulation of the pace of movement of the resistance linkage via observation of the graphical element on the display of the mobile communications device paired with the transmitter.

Clause 22. The technology of each preceding clause alone or in combination, wherein the resistance linkage includes a cable, a band, or a chain.

Clause 23. The technology of each preceding clause alone or in combination, wherein the resistance linkage includes a rigid bar.

Clause 24. The technology of each preceding clause alone or in combination, wherein the resistance applicator includes a resistive motor.

Clause 25. The technology of each preceding clause alone or in combination, wherein the resistance applicator includes weights.

Clause 26. The technology of each preceding clause alone or in combination, wherein the resistance applicator includes at least one of a resistance band, a hydraulic piston, a magnetic resistor, or a fly wheel.

Clause 27. The technology of each preceding clause alone or in combination, the user-engaging element includes at least one of a handle, a ring, a loop, a T-bar, roped-ball, a pedal, or a paddle.

Clause 28. The technology of each preceding clause alone or in combination, wherein the at least one sensor includes an image sensor.

Clause 29. The technology of each preceding clause alone or in combination, wherein the resistance linkage is a cable and wherein the at least one sensor is configured to determine cable movement by detecting rotation of a spool on which the cable is wound.

Clause 30. The technology of each preceding clause alone or in combination, wherein the sensor is an integral part of a resistance motor connected to the spool.

Clause 31. The technology of each preceding clause alone or in combination, wherein the graphical element is a paddle, and wherein the at least one processor is configured to generate the pacing signals in a form for causing the paddle to move on the display in a manner correlated to movement of the resistance linkage.

Clause 32. The technology of each preceding clause alone or in combination, wherein the software is configured to cause pacing elements to move on the display, and wherein the at least one processor is configured to generate the pacing signals in a form for causing the graphical element to collide with the pacing elements when a pace of the resistance linkage corresponds to a predetermined exercise pace.

Clause 33. The technology of each preceding clause alone or in combination, where the at least one processor is configured to output a mode signal, and wherein the mode signal is configured to control the pacing elements.

Clause 34. The technology of each preceding clause alone or in combination, where the at least one processor is configured to output a mode signal, and wherein the mode signal is configured to alter a mode of the software.

Clause 35. A non-transitory computer readable medium containing instructions that when executed by at least one processor causes the at least one processor to perform operations for causing a mobile communications device to serve as a gamification display for regulating usage of an exercise machine, the operations comprising: pairing the mobile communications device with a communications module associated with an exercise machine, wherein the pairing includes establishing a communications channel between the mobile communications device and the exercise machine; receiving, via the communications channel from a sensor associated with the exercise machine, signals indicative of a pace of movement of a resistance linkage of the exercise machine; and cause a graphical element to move on a display of the mobile communications device, the movement of the graphical element corresponding to movement of the resistance linkage of the exercise machine thereby enabling regulation of the pace of movement of the resistance linkage via observation of the graphical element on the display of the mobile communications device.

Clause 36. The technology of each preceding clause alone or in combination, wherein the resistance linkage is a cable, wherein the sensor is configured to sense rotation of a spool on which the cable is wound, and wherein the signals indicative of the pace of movement are reflective of movement of the cable.

Clause 37. The technology of each preceding clause alone or in combination, wherein the sensor is an integral part of a resistance motor connected to the spool.

Clause 38. The technology of each preceding clause alone or in combination, wherein the graphical element is a paddle, and wherein the operations further cause the paddle to move on the display in a manner correlated to movement of the resistance linkage.

Clause 39. The technology of each preceding clause alone or in combination, wherein the operations further include causing pacing elements to move on the display of the mobile communications device, and for causing the graphical element to collide with the pacing elements when a pace of the resistance linkage corresponds to a predetermined exercise pace.

Clause 40. The technology of each preceding clause alone or in combination, wherein the signals are further indicative of a direction of linkage movement, and wherein the at least one processor is configured to cause a graphical element to change direction on the display when the linkage movement changes direction.

Disclosed embodiments may include any one of the following bullet-pointed features alone or in combination with one or more other bullet-pointed features, whether implemented as a system (e.g., an exercise machine, a computing device, a resistance motor) and/or method, by at least one processor or circuitry, and/or stored as executable instructions on non-transitory computer readable media or computer readable media.

gamifying a physical exertion session;

receiving signals indicative of exercise equipment movement repetitions;

signals corresponding to at least one property of manual exercise movements;

presenting via a display, a controllable element;

a controllable element being movable along a first axis;

presenting via a display, a plurality of pacing elements movable along a plurality of second axes transverse to a first axis;

movement of pacing elements corresponds to a desired pace of exercise equipment movement repetitions;

regulating movement of a controllable element along a first axis in a manner corresponding to speeds of manual exercise movements;

determining collisions between a controllable element movable along a first axis and a plurality of pacing elements movable along a plurality of transverse second axes;

upon determination of a collision, causing a collision indication to appear on a display;

a control element is a horizontally movable object, and pacing elements are simulations of vertical falling objects;

a horizontally movable object is a paddle;

a collision indication occurs at a transverse intersection of a controllable element and a colliding pacing element;

exercise equipment includes a transmitter for transmitting signals;

a display is associated with a mobile computing device paired with a transmitter of exercise equipment;

exercise equipment includes free weights;

signals correspond to an output of an image sensor arranged to detect movement of free weights;

exercise equipment includes a weight machine having a sensor for outputting signals;

signals are derived from an image sensor;

a weight machine includes a cable;

manual exercise movements correspond to movement of a cable;

a sensor is configured to detect movement of a cable;

signals are indicative of cable movement;

a sensor is configured to detect movement by sensing rotation of a spool on which a cable is wound;

a sensor is an integral part of a resistance motor connected to a spool;

a first subset of the plurality of pacing elements, including at least two of a plurality of pacing elements, move along a common one of a plurality of second axes;

each of a second subset of the plurality of pacing elements move along a differing one of second axes;

tallying a score based on a number of determined collisions;

a tallied score includes a numerical indication of a number of determined collisions;

a system for gamifying a physical exertion session including at least one processor;

receive signals indicative of exercise equipment movement repetitions;

signals corresponding to speeds of manual exercise movements;

present via a display, a controllable element;

a controllable element being movable along a first axis;

present via a display, a plurality of pacing elements movable along a plurality of second axes transverse to a first axis;

movement of a plurality of pacing elements corresponds to a desired pace of exercise equipment movement repetitions;

regulate movement of the controllable element along the first axis in a manner corresponding to speeds of manual exercise movements;

determine collisions between the controllable element movable along a first axis and a plurality of pacing elements movable along a plurality of transverse second axes;

upon determination of a collision, cause a collision indication to appear on a display;

a control element is a horizontally movable object, and pacing elements are simulations of vertically falling objects;

exercise equipment includes a transmitter for transmitting signals;

a display is associated with a mobile computing device paired with a transmitter of exercise equipment;

a first subset of a plurality of pacing elements including at least two of the plurality of pacing elements moving along a common one of a plurality of second axes;

at least one property of manual exercise movements includes at least one of a velocity associated with cable movement, an acceleration with cable movement, a cable displacement, or a cable position;

an exercise machine configured for pairing with a mobile communications device in order to permit the mobile communications device to be used as a gamification display for regulating usage of the exercise machine;

a frame;

a resistance linkage;

a resistance applicator mounted to a frame and coupled to a resistance linkage;

a resistance applicator configured to apply resistance to a user-engaging element associated with a resistance linkage;

at least one sensor for detecting a first pace of movement of a resistance linkage;

a transmitter configured for pairing with a mobile communications device having a display and running software for causing a graphical element to move on the display;

at least one processor configured to receive pace indications from at least one sensor and to output pacing signals for transmission by a transmitter;

pacing signals configured, upon receipt by a mobile communications device, to cause a graphical element to move at a second pace corresponding to a first pace of movement of a resistance linkage thereby enabling regulation of a pace of movement of the resistance linkage via observation of the graphical element on a display of the mobile communications device paired with a transmitter a resistance linkage includes a cable, a band, or a chain;

a resistance linkage includes a rigid bar;

a resistance applicator includes a resistive motor;

a resistance applicator includes weights;

a resistance applicator includes at least one of a resistance band, a hydraulic piston, a magnetic resistor, or a fly wheel;

a user-engaging element includes at least one of a handle, a ring, a loop, a T-bar, roped-ball, a pedal, or a paddle;

at least one sensor includes an image sensor;

a resistance linkage is a cable and wherein the at least one sensor is configured to determine cable movement by detecting rotation of a spool on which the cable is wound;

a sensor is an integral part of a resistance motor connected to a spool;

a graphical element is a paddle;

at least one processor is configured to generate pacing signals in a form for causing a paddle to move on a display in a manner correlated to movement of a resistance linkage;

software is configured to cause pacing elements to move on a display;

at least one processor is configured to generate pacing signals in a form for causing a graphical element to collide with pacing elements when a pace of a resistance linkage corresponds to a predetermined exercise pace;

at least one processor is configured to output a mode signal, and wherein the mode signal is configured to control the pacing elements;

at least one processor is configured to output a mode signal, and wherein the mode signal is configured to alter a mode of the software;

A non-transitory computer readable medium containing instructions that when executed by at least one processor causes the at least one processor to perform operations for causing a mobile communications device to serve as a gamification display for regulating usage of an exercise machine;

pairing a mobile communications device with a communications module associated with an exercise machine;

pairing includes establishing a communications channel between the mobile communications device and the exercise machine;

receiving, via the communications channel from a sensor associated with the exercise machine, signals indicative of a pace of movement of a resistance linkage of the exercise machine;

causing a graphical element to move on a display of the mobile communications device;

movement of a graphical element corresponding to movement of a resistance linkage of an exercise machine thereby enabling regulation of a pace of movement of the resistance linkage via observation of the graphical element on the display of the mobile communications device;

a resistance linkage is a cable;

a sensor is configured to sense rotation of a spool on which the cable is wound;

signals indicative of a pace of movement are reflective of movement of a cable;

a sensor is an integral part of a resistance motor connected to a spool;

a graphical element is a paddle;

causing a paddle to move on a display in a manner correlated to movement of a resistance linkage;

causing pacing elements to move on a display of a mobile communications device, and for causing a graphical element to collide with pacing elements when a pace of a resistance linkage corresponds to a predetermined exercise pace;

signals are further indicative of a direction of linkage movement;

cause a graphical element to change direction on the display when the linkage movement changes direction.

What is claimed is:

1. A non-transitory computer readable medium containing instructions that when executed by at least one processor causes the at least one processor to perform operations for gamifying a physical exertion session, the operations comprising:

receiving signals indicative of exercise equipment movement repetitions, the signals corresponding to at least one property of manual exercise movements;

presenting via a display, a controllable element corresponding to the manual exercise movements, the controllable element being movable along a first axis;

presenting via the display, a plurality of pacing elements movable along a plurality of second axes transverse to the first axis, wherein movement of the pacing elements corresponds to a desired pace of the exercise equipment movement repetitions;

based on the received signals, regulating movement of the controllable element along the first axis in a manner corresponding to speeds of the manual exercise movements;

determining collisions between the controllable element movable along the first axis and the plurality of pacing elements movable along the plurality of transverse second axes, the collisions indicating that the speeds of the manual exercise movements match the desired pace of the exercise equipment movement repetitions; and upon determination of a collision, causing a collision indication to appear on the display.

2. The computer readable medium of claim 1, wherein the control element is a horizontally movable object, and the pacing elements are simulations of vertical falling objects.

3. The computer readable medium of claim 2, wherein the horizontally movable object is a paddle.

4. The computer readable medium of claim 2, wherein the collision indication occurs at a transverse intersection of the controllable element and a colliding pacing element.

5. The computer readable medium of claim 1, wherein the exercise equipment includes a transmitter for transmitting the signals, and wherein the display is associated with a mobile computing device paired with the transmitter of the exercise equipment.

6. The computer readable medium of claim 1, wherein the exercise equipment includes free weights and wherein the signals correspond to an output of an image sensor arranged to detect movement of the free weights.

7. The computer readable medium of claim 1, wherein the exercise equipment includes a weight machine having a sensor for outputting the signals.

8. The computer readable medium of claim 7, wherein the weight machine includes a cable, wherein the manual exercise movements correspond to movement of the cable, wherein the sensor is configured to detect the movement of the cable, and wherein the signals are indicative of the cable movement.

9. The computer readable medium of claim 8, wherein the sensor is configured to detect movement by sensing rotation of a spool on which the cable is wound.

10. The computer readable medium of claim 9, wherein the sensor is an integral part of a resistance motor connected to the spool.

11. The computer readable medium of claim 1, wherein the signals are derived from an image sensor.

12. The computer readable medium of claim 1, wherein a first subset of the plurality of pacing elements, including at least two of the plurality of pacing elements, move along a common one of the plurality of second axes.

13. The computer readable medium of claim 12, wherein each of a second subset of the plurality of pacing elements move along a differing one of the second axes.

14. The computer readable medium of claim 12, wherein the operations further include tallying a score based on a number of determined collisions.

15. The computer readable medium of claim 14, wherein the tallied score includes a numerical indication of a number of determined collisions.

16. The non-transitory computer readable medium of claim 1, wherein the at least one property of manual exercise movements includes at least one of a velocity associated with cable movement, an acceleration with cable movement, a cable displacement, or a cable position.

17. A system for gamifying a physical exertion session, the system comprising:

at least one processor configured to:

receive signals indicative of exercise equipment movement repetitions, the signals corresponding to speeds of manual exercise movements;

present via a display, a controllable element corresponding to the manual exercise movements, the controllable element being movable along a first axis;

present via the display, a plurality of pacing elements movable along a plurality of second axes transverse to the first axis, wherein movement of the plurality of pacing elements corresponds to a desired pace of the exercise equipment movement repetitions;

based on the received signals, regulate movement of the controllable element along the first axis in a manner corresponding to the speeds of manual exercise movements;

determine collisions between the controllable element movable along the first axis and the plurality of pacing elements movable along the plurality of transverse second axes, the collisions indicating that the speeds of the manual exercise movements match the desired pace of the exercise equipment movement repetitions; and upon determination of a collision, cause a collision indication to appear on the display.

18. The system of claim 17, wherein the control element is a horizontally movable object, and the pacing elements are simulations of vertically falling objects.

19. The system of claim 17, wherein the exercise equipment includes a transmitter for transmitting the signals, and wherein the display is associated with a mobile computing device paired with the transmitter of the exercise equipment.

20. The system of claim 17, wherein a first subset of the plurality of pacing elements including at least two of the plurality of pacing elements moving along a common one of the plurality of second axes.

* * * * *